US009421991B2

(12) United States Patent
Driessen

(10) Patent No.: US 9,421,991 B2
(45) Date of Patent: Aug. 23, 2016

(54) DEVICES FOR SUPPORTING A CHILD

(75) Inventor: Franciscus Johannes Cornelus Driessen, Goirle (NL)

(73) Assignee: MUTSY B.V., Goirle (NL)

( * ) Notice: Subject to any disclaimer, the term of this patent is extended or adjusted under 35 U.S.C. 154(b) by 362 days.

(21) Appl. No.: 13/823,407

(22) PCT Filed: Sep. 15, 2011

(86) PCT No.: PCT/NL2011/000064
§ 371 (c)(1),
(2), (4) Date: May 16, 2013

(87) PCT Pub. No.: WO2012/036542
PCT Pub. Date: Mar. 22, 2012

(65) Prior Publication Data
US 2013/0221636 A1    Aug. 29, 2013

(30) Foreign Application Priority Data
Sep. 16, 2010 (NL) .................................... 2005363

(51) Int. Cl.
*B62B 7/10* (2006.01)
*B62B 7/06* (2006.01)
*B62B 7/04* (2006.01)
*B62B 7/08* (2006.01)
*A47D 1/02* (2006.01)
*A47D 9/00* (2006.01)

(52) U.S. Cl.
CPC ... *B62B 7/06* (2013.01); *A47D 1/02* (2013.01); *A47D 9/005* (2013.01); *B62B 7/08* (2013.01); *B62B 2205/02* (2013.01)

(58) Field of Classification Search
CPC .............. B62B 7/04; B62B 7/06; B62B 7/10; B62B 7/105; B62B 7/004; B62B 3/022; B62B 3/027
USPC ........................ 280/642, 644, 647, 650, 47.38
See application file for complete search history.

(56) References Cited

U.S. PATENT DOCUMENTS

| 4,094,531 A | * | 6/1978 | Cabagnero .................... 280/649 |
| 4,216,974 A | | 8/1980 | Kassai |
| 4,813,701 A | * | 3/1989 | Balland ......................... 280/641 |
| 5,687,984 A | * | 11/1997 | Samuel ......................... 280/641 |

(Continued)

FOREIGN PATENT DOCUMENTS

| FR | 2383815 | 10/1978 |
| FR | 2394435 A1 | 1/1979 |

(Continued)

OTHER PUBLICATIONS

International Search Report PCT/ISA/210 for PCT/NL2011/000064 datedDec. 6, 2011.

*Primary Examiner* — Joseph Rocca
*Assistant Examiner* — Travis Coolman
(74) *Attorney, Agent, or Firm* — Harness, Dickey & Pierce, P.L.C.

(57) ABSTRACT

The present application relates to a device for supporting a child. The application also relates to a pushchair, a high chair and a child's bed provided with such a device. According to at least one embodiment of the invention, a relative rotation movement of the undercarriage and upper carriage of the device is converted by means of a transmission into a movement collapsing the undercarriage. The device can hereby also be reduced in size in a transverse direction.

42 Claims, 18 Drawing Sheets

(56) References Cited

U.S. PATENT DOCUMENTS

| | | | |
|---|---|---|---|
| 6,425,599 B1 * | 7/2002 | Tsai | 280/652 |
| 6,464,242 B2 * | 10/2002 | Suzuki | 280/642 |
| 6,921,102 B2 * | 7/2005 | Hsia | 280/642 |
| 6,991,248 B2 * | 1/2006 | Valdez et al. | 280/647 |
| 7,007,968 B2 * | 3/2006 | Yamazaki et al. | 280/647 |
| 7,168,728 B2 * | 1/2007 | Suga et al. | 280/642 |
| 7,562,895 B2 * | 7/2009 | Santamaria | 280/642 |
| 7,571,926 B2 * | 8/2009 | Huang | 280/647 |
| 7,651,116 B2 * | 1/2010 | Hou | 280/642 |
| 8,186,706 B2 * | 5/2012 | Dotsey | 280/647 |
| 8,696,015 B2 * | 4/2014 | Karremans et al. | 280/642 |
| 2003/0106149 A1 | 6/2003 | Hsia | |
| 2007/0069504 A1 | 3/2007 | Lan | |
| 2008/0054601 A1 * | 3/2008 | Li | 280/642 |
| 2009/0008909 A1 * | 1/2009 | Kassai et al. | 280/658 |
| 2009/0278335 A1 | 11/2009 | Dotsey | |

FOREIGN PATENT DOCUMENTS

| | | |
|---|---|---|
| FR | GB 1584115 | 2/1981 |
| WO | WO-2009089540 A2 | 7/2009 |

* cited by examiner

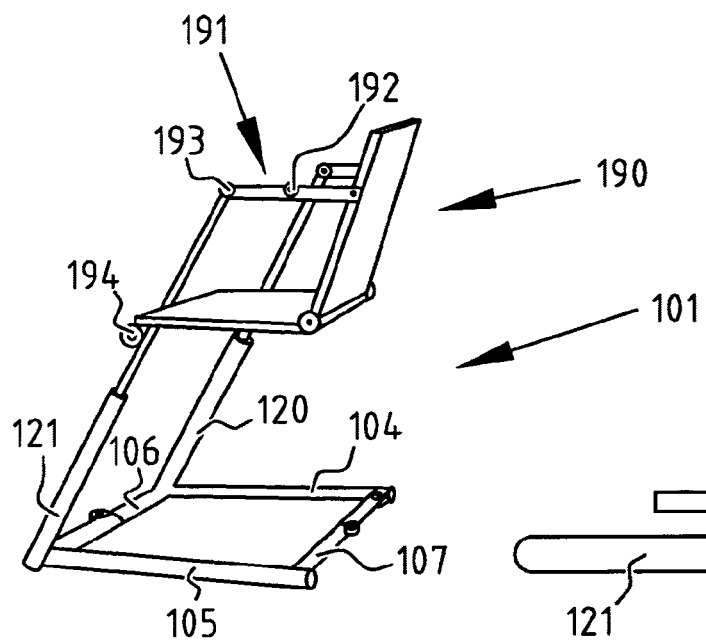
FIG. 10A
FIG. 10B
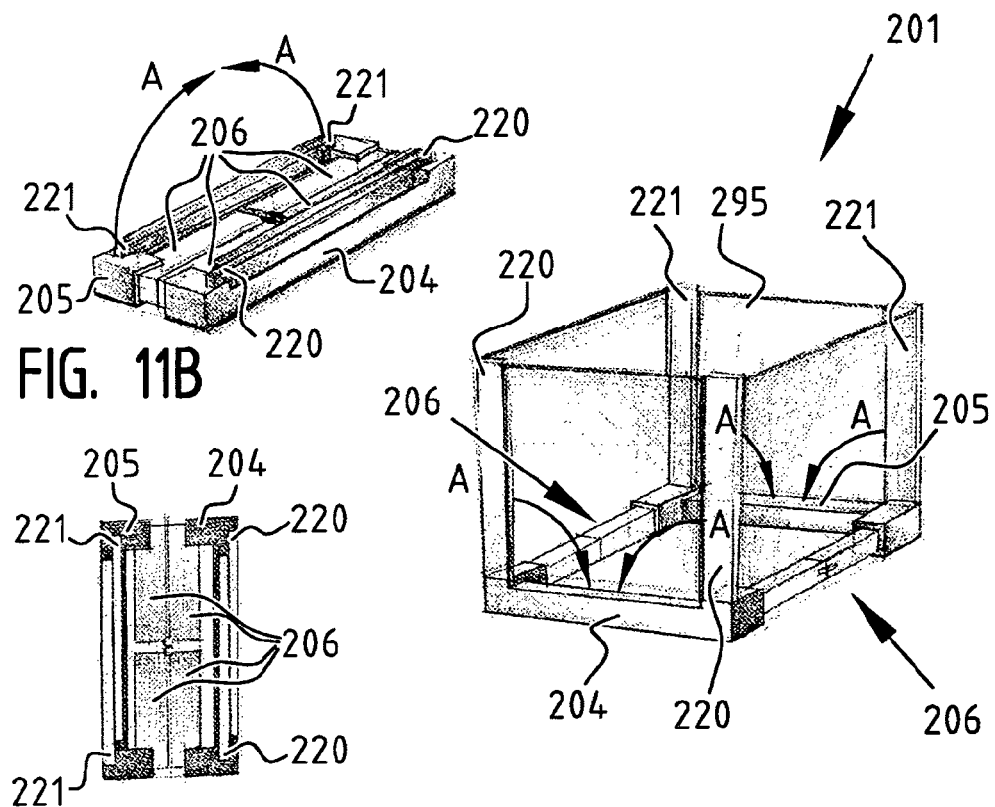
FIG. 11B
FIG. 11C
FIG. 11A

DEVICES FOR SUPPORTING A CHILD

The present invention relates to a device for supporting a child. The invention also relates to a pushchair, a high chair and a child's bed provided with such a device.

Diverse devices for supporting a child are known. An example of a device is a pushchair. Because the pushchair is necessary or desirable in many situations for the purpose of transporting a child, the pushchair has to be easily transportable. The known pushchair provides for this need in that it takes a collapsible form. By operating a locking mechanism or locking mechanisms the pushchair is brought into a non-stable state, after which the pushchair can be collapsed. The extent to which a pushchair is collapsible determines how much space is required, for instance in a car, for transport of the pushchair. The size of the collapsed pushchair therefore remains a continuous problem.

The known pushchair usually makes use of known techniques using crosses for the purpose of making the pushchair collapsible. This principle is based on the fact that during pivoting a pivotable cross becomes longer and narrower or, conversely, shorter and wider. The required collapsibility can be obtained by arranging a cross at the correct location in the pushchair, for instance between a left and right-hand part of the pushchair as seen from a direction of forward movement of the pushchair. A drawback of this type of technique is the limited stiffness that is provided, and particularly stiffness in the direction in which the pushchair collapses, such as for instance the transverse direction. The known collapsible pushchairs are hereby not usually stiff in the collapsing direction.

Another drawback of known collapsible pushchairs is that they leave little or no space for a qualitatively high-grade seat part in the collapsed position. Even if a seat part is or were to be present, such a seat part does not allow any acceptable adjustment options for the back.

Another drawback lies in the fact that known techniques usually make use of moving parts which can come into contact with a child. The child may hereby become caught between the mechanically movable components of the pushchair.

Another drawback of known solutions is the limited space available for storage of luggage.

Another drawback is to be found in the complexity of the operations which must be performed during collapsing of the pushchair. It is a known problem that collapsing a pushchair is generally not intuitive. In the absence of an operating manual collapsing of the pushchair may cause the user considerable difficulty.

A further drawback is related to the dimensions of known products. When a user requires a solution for the purpose of transporting a child, this user will usually make use of a buggy. This type of pushchair is generally light and collapsible such that a compact form is obtained which is highly suitable when travelling. If the user wants more comfort for him or herself as well as for the child, a larger pushchair is usually used. Although these pushchairs are collapsible, the volume taken up by the collapsed pushchairs is for many users too substantial for simple use or for transport. The larger pushchair can however provide options such as the fitting of a carrycot or a car seat. A user must therefore make a continuous trade-off between comfort and options on the one hand and ease of transport on the other.

It will be apparent to the skilled person that the above stated requirements exist not only for pushchairs but also apply in respect of collapsible high chairs and child's beds. In the context of the present application these types of product are designated as devices for supporting a child. It should however be noted that the present invention is particularly suitable for the already explicitly stated examples of these types of device.

The present invention provides a device for supporting a child, wherein the above stated problems do not occur, or at least hardly so.

The device according to the invention comprises an undercarriage with a pivotable transverse connection, wherein the undercarriage is collapsible in a first direction by means of pivoting the pivotable transverse connection. The device further comprises an upper carriage pivotally coupled to the undercarriage, wherein the undercarriage and upper carriage can rotate toward each other. It is noted here that the use of the words undercarriage and upper carriage refers only to the orientation during normal use.

The device also comprises a transmission for converting a relative rotation movement of the undercarriage and the upper carriage toward each other to a collapsing movement of the pivotable transverse connection. The device is movable here between a collapsed position, wherein the undercarriage is folded down, and a position of use wherein the upper carriage extends at an angle relative to the undercarriage. In the position of use the device is folded open. When the upper carriage and undercarriage lie substantially one on top of the other in the collapsed position, a very compact pushchair is obtained.

In the context of the present invention a transverse connection is seen as a connection in a transverse direction of the device which, at least in the position of use, increases the stiffness of the device in the transverse direction.

In the context of the present invention the transmission for converting a relative rotation movement of the undercarriage and the upper carriage toward each other to a collapsing movement of the pivotable transverse connection comprises a series of mechanically coupled elements, each of which moves during said conversion.

With the device according to the invention it is thus possible by means of rotating undercarriage and upper carriage toward each other to simultaneously collapse the device, and then the undercarriage in particular. A reduction in size is hereby achieved in two directions, for instance in the vertical direction and in the transverse direction.

In an embodiment of the present invention the undercarriage and the upper carriage can rotate toward each other along a rotation axis substantially parallel to the first direction. In the context of the present invention a rotation axis does not necessarily imply the presence of an actually physical shaft. Rotation axis can likewise refer to the associated mathematical concept.

In an embodiment of the present invention the transverse connection is disposed at the position of the rotation axis. The device is hereby strengthened in the transverse direction at a vulnerable point, i.e. where the undercarriage and upper carriage pivot relative to each other.

In an embodiment of the present invention the transverse connection comprises a first elongate part and a second elongate part which are coupled to each other for mutual pivoting at an end and which are each separately coupled pivotally to the remaining part of the undercarriage at another end, and wherein in the position of use the first elongate part lies in line with and/or is locked to the second elongate part. Because the parts lie in line in the position of use and therefore form a continuous whole, the stiffness of the undercarriage in the first direction is increased. It is also possible to provide the transverse connection with a stop which prevents further relative rotation of the first and second elongate parts. Such a stop must however not make the collapsing movement impossible.

The primary function of the elongate part is to create distance necessary for the purpose of forming the undercarriage. The elongate part is consequently a spacer part. Other forms of spacer part, such as discs or plate parts, are not precluded.

In an embodiment of the present invention the transverse connection comprises a hinge element for the purpose of said mutual pivoting of the first elongate part and the second elongate part, wherein the transmission is adapted to convert the relative rotation movement of upper carriage and undercarriage toward each other to a movement of the hinge element for the purpose of collapsing the undercarriage. The hinge element can comprise a plurality of separate hinges. The hinge element can thus comprise a platform on which the first elongate part and the second elongate part are pivotally mounted independently of each other. The transmission is preferably direct. This implies that the hinge element is actively moved as a result of the relative rotation of the undercarriage and the upper carriage by means of a mechanical construction which engages the hinge element or the transverse connection and exerts rotation, pulling or pushing forces thereon.

In an embodiment of the present invention the upper carriage is collapsible in the first direction by means of a further pivotable transverse connection embodied similarly to the above stated transverse connection. The upper carriage is embodied here such that, during the relative rotation movement of the upper carriage and the undercarriage toward each other, the further transverse connection collapses. In a possible embodiment the further transverse connection thus comprises a first elongate part and a second elongate part. Instead of being pivotally coupled to the undercarriage, these parts are pivotally coupled to the upper carriage. A hinge element can also be used in this further transverse connection for pivotable coupling of the first elongate part and the second elongate part. The stiffness of the upper carriage in the first direction is increased by also fitting the upper carriage with a transverse connection.

In an embodiment of the present invention the undercarriage comprises a further pivotable transverse connection embodied similarly to the above stated transverse connection. The addition of this further transverse connection to the undercarriage likewise increases the stiffness of the undercarriage in the first direction. It is recommended that the transverse connection and the further transverse connection of the undercarriage are coupled such that they pivot substantially simultaneously. Owing to the coupling only the transverse connection or the further transverse connection need be moved for the purpose of collapsing the undercarriage.

In an embodiment of the present invention the device comprises a locking mechanism which can be operated by a user to lock the transverse connection and/or a further locking mechanism which can be operated by a user to lock the further transverse connection of the undercarriage and/or a further locking mechanism which can be operated by a user to lock the further transverse connection of the upper carriage. Because the collapsing movement of the undercarriage and/or the upper carriage and the relative rotation movement of the undercarriage and upper carriage are linked, i.e. they cannot be performed independently of each other, or hardly so, it may be sufficient to lock one of the active parts. An active part is here a part which moves during the above stated rotation or folding movement. Examples of active parts are the transverse connection or further transverse connection of the undercarriage or the further transverse connection of the upper carriage. A separate locking mechanism can be provided per active part.

In an embodiment of the present invention the undercarriage comprises a first arm provided with a first coupling housing and a second arm provided with a second coupling housing. The first elongate part is pivotally connected here to the first coupling housing and the second elongate part is pivotally connected to the second coupling housing. The upper carriage is also pivotally connected to the first coupling housing and the second coupling housing. Placing together the pivot points between the transverse connection and the remaining part of the undercarriage and the pivot points for the relative rotation movement of the undercarriage and the upper carriage concentrates the functionality of the device, whereby other parts of the device still remain available for other functions. In the case of a pushchair the concentration of functions can for instance enlarge the available luggage space.

In an embodiment of the present invention the first and second coupling housings are each connected to support structures, for instance support blocks or wheels, for supporting the device on a ground surface. This measure also results in a further concentration of functionality.

In an embodiment of the present invention the first arm, the second arm, the transverse connection and the further transverse connection of the undercarriage lie substantially in the same plane wherein, during collapsing of the transverse connection and/or further transverse connection of the undercarriage, the associated first elongate part and the associated second elongate part pivot in the plane. Owing to this functionality the dimension of the device in the collapsed state can decrease in a direction in the same plane.

In an embodiment of the present invention the first arm, the second arm and the transverse connection form a U-shaped profile, or the first arm, the second arm, the transverse connection and the further transverse connection of the undercarriage form a rectangular profile, or the first arm, the second arm and the transverse connection form a triangular profile wherein the first arm and the second arm are pivotally coupled to each other on a side directed away from the transverse connection. The rectangular profile or the U-shaped profile allow the device to be supported at four corner points. The triangular profile can for instance be used in a pushchair with three wheels. The ends of the first arm and second arm directed away from the transverse connection can be pivotally connected in order to enable collapse.

In an embodiment of the present invention the upper carriage comprises a third arm pivotally coupled to the first coupling housing, and a fourth arm pivotally coupled to the second coupling housing. An optionally present further transverse connection of the upper carriage can here be pivotally connected to both the third arm and the fourth arm. In this latter case the first elongate part of the further transverse connection of the upper carriage is pivotally coupled to the third arm and the second elongate part of the further transverse connection of the upper carriage is pivotally coupled to the fourth arm.

In an embodiment of the present invention the device comprises a separate transmission for converting a relative rotation movement of the first arm and the third arm toward each other to a collapsing movement of the first elongate part of the transverse connection and/or for converting a relative rotation movement of the second arm and the fourth arm toward each other to a collapsing movement of the second elongate part of the transverse connection. A balanced device is obtained by using a plurality of transmissions, particularly when this results in a symmetrical device with a plane of symmetry perpendicularly of the first direction, and due to the hinge element of the transverse connection and/or further transverse connection.

In an embodiment of the present invention the device comprises a connecting arm between the undercarriage and the upper carriage, wherein the connecting arm is coupled slidably and pivotally to the undercarriage and is connected pivotally to the upper carriage. Such a connecting arm can be placed between the first arm and the third arm and/or between the second arm and the fourth arm. In an embodiment of the pivotable and slidable coupling the connecting arm is pivotally coupled at an end directed toward the undercarriage to a carriage. The carriage can then slide in a slot or groove in the undercarriage, for instance a groove in the first or second arm.

In an embodiment of the present invention the device comprises a locking mechanism for locking the sliding movement of the connecting arm between the first arm and the third arm and/or for locking the sliding movement of the connecting arm between the second arm and the fourth arm. A separate locking mechanism can be provided here per arm combination. It will however be apparent to the skilled person that both sliding movements are linked via the transverse connection in the undercarriage.

In an embodiment of the present invention the transmission comprises a coupling arm between the transverse connection and the connecting arm, wherein the connecting arm and coupling arm are embodied such that, during the relative rotation movement of the undercarriage and the upper carriage toward each other, the connecting arm slides away from the transverse connection and hereby causes pivoting of the transverse connection. During the rotation of the upper carriage to the undercarriage, or vice versa, the connecting arm slides away from the transverse connection. Due to the coupling between transverse connection and connecting arm by means of the coupling arm the hinge element is pulled, whereby the transverse connection will pivot. A consequence hereof is that during rotation the undercarriage will collapse in the first direction.

A coupling arm can be disposed between the connecting arm for the first arm and the first elongate part and between the connecting arm for the second arm and the second elongate part. Once again a balanced device can be obtained through symmetrical use of the coupling arm. A further advantage of symmetrical use of this or other measures is that it then becomes possible to apply a dual locking, for instance a locking for the left-hand side and right-hand side of the device as seen from the first arm. The safety of the device can hereby be increased because two separate locking mechanisms will have to be operated to enable the rotation and collapsing movement.

In an embodiment of the present invention the connecting arms are mutually connected by means of a bar construction which can be collapsed in the first direction, wherein the bar construction is biased so as to form a stiff connection between the connecting arms in the position of use. Such a bar construction generally comprises a plurality of pivotally coupled tube parts under spring tension such that a stiff entity is obtained.

In an embodiment of the present invention the bar construction has a dead centre beyond which the bar construction must move so as to no longer form a stiff connection. The device is further provided here with an unlocking mechanism which can be operated by a user to unlock the bar construction by moving the bar construction beyond the dead centre. Owing to the linking of the rotation movement and collapsing movement this unlocking mechanism likewise locks the rotation movement.

In the context of the present invention the terms unlocking mechanism and locking mechanism are used to refer to roughly the same functionality. A locking mechanism for locking the sliding movement of the connecting arm can for instance also be seen as an unlocking mechanism. Operation of the locking mechanism does after all ensure that the sliding movement becomes possible.

In an embodiment of the present invention the unlocking mechanism for the bar construction and the locking mechanism for locking the sliding movement of the connecting arm between the first arm and the third arm or the connecting arm between the second arm and the fourth arm can be operated simultaneously by a single operation by the user. This increases the user convenience. The above advantage can for instance be achieved in that said mechanisms are coupled mechanically and can be operated with the same operating element. This does not otherwise preclude the mechanisms taking a dual form, for instance on the left and right. The single operation then refers to substantially simultaneous operation of the operating element associated with the left and right-hand mechanism.

In an embodiment of the present invention the upper carriage comprises a first upper carriage part and a second upper carriage part which are pivotally coupled to each other for mutual pivoting about an axis parallel to the rotation axis. This is advantageous for instance when the length of the upper carriage in the collapsed position is greater than the length of the undercarriage. The length of the upper carriage could hereby determine the overall length of the device in the collapsed position. By now also giving the upper carriage a pivotable form this length can be reduced, for instance substantially halved.

In an embodiment of the present invention the connecting arm is coupled slidably and pivotally to the first upper carriage part and connected pivotally to the undercarriage. The device further comprises a child's seat collapsible in the first direction and provided with a back part and a seat part mutually connected by a hinge for a rotation about an axis parallel to the first direction. The seat part comprises here on a hip side thereof a seat arm which is connected pivotally from the hinge to the connecting arm as well as a seat part coupling arm which is connected pivotally from the hinge to the first upper carriage part. The back part comprises on a side thereof a back arm which extends from the hinge and which is pivotally connected directly or via a transmission to the second upper carriage part.

In a further embodiment the child's seat is provided with a first insert part which is received in a recess in the first upper carriage part. The seat part coupling arm is pivotally connected here to the first insert part, and the child's seat further comprises a second insert part which is received in a recess in the second upper carriage part and to which the back arm is pivotally connected.

In a further embodiment the connection between the first and second insert parts and respectively the first upper carriage part and the second upper carriage part is releasable, whereby the child's seat can be detached from the rest of the device.

In an embodiment of the present invention the device comprises a locking mechanism which can be operated by a user for mutual locking of the first and second upper carriage parts. In the locked position thereof the first and second upper carriage parts are in line in order to form one elongate part.

In an embodiment of the present invention the locking mechanism for locking the sliding movement of the connecting arm between the first arm and the third arm and/or for locking the sliding movement of the connecting arm between the second arm and the fourth arm comprises an operating element for said operation of the locking mechanism which is received in the first or second upper carriage part and which can only be accessed and/or operated by a user after unlocking and relative rotation of the first and second upper carriage parts. The operating element which a user must operate to rotate and collapse the undercarriage and upper carriage cannot therefore be accessed and/or operated when the first and second upper carriage parts are still locked. The operating element can for instance be received close to the pivot point between the first and second upper carriage parts and in one of these parts. Owing to the mutual pivoting of the upper carriage parts an inner side of these parts is left clear, whereby it becomes possible for a user to operate the operating element. Another option is that the operating element is blocked when the first and second upper carriage parts have not yet been pivoted relative to each other.

It should be noted that the above system with an operating element which only becomes available when upper carriage parts are pivoted can also be applied if the locking mechanism associated with the operating element locks only the rotation movement, this separately of the locking of a collapsing movement. Such a system can thus be applied per se in already existing systems wherein an upper carriage can rotate relative to an undercarriage. An example of such a system is a pushchair wherein the upper carriage is formed by two parallel push bars which can rotate relative to an undercarriage provided with wheels.

In an embodiment of the present invention the transmission comprises a first engaging element connected to an end of the upper carriage and a second engaging element connected to an end of the transverse connection, wherein the first and second engaging elements are mutually engaging. These engaging elements each comprise for instance a toothed wheel part. By making use of engaging elements between the upper carriage and the transverse connection the number of components can be reduced because the transmission is direct. It will be apparent to the skilled person that the use of a whole toothed wheel is not precluded, since a toothed wheel comprises a toothed wheel part.

In an embodiment of the present invention the upper carriage is fixedly connected at an end to a first toothed wheel part which is disposed for rotation about the rotation axis and wherein the transverse connection is fixedly connected at an end to a second toothed wheel part which engages perpendicularly on the first toothed wheel part. The toothed wheel parts thus move in the same plane as the component connected to the toothed wheel part, or in a plane parallel thereto.

In a further embodiment of the present invention the third arm is fixedly connected at an end thereof to the first toothed wheel part which rotates about the rotation axis during a relative rotation movement of the undercarriage and the upper carriage toward each other, and wherein the first elongate part is connected at an end directed toward the first arm to the second toothed wheel part, wherein the second toothed wheel part can rotate about a first axis connected fixedly to the first arm for the purpose of said pivoting of the first elongate part relative to the first arm.

In yet another embodiment of the present invention the first axis is placed in the first coupling housing and the third arm is provided at an end thereof with a second axis which extends parallel to the rotation axis and in a cavity of the first coupling housing, and which second axis is connected at an end thereof to the first toothed wheel part.

The above stated transmission can thus be received wholly or almost wholly in the first coupling housing. Sharp movable parts or parts between which a child can catch a finger hereby remain shielded. This increases the safety of the device.

In a further embodiment of the present invention a first toothed wheel part and second toothed wheel part are likewise disposed in similar manner as described above for the second arm, the fourth arm and the second elongate part. This also improves the symmetry and balance of the system.

The invention also provides a pushchair which comprises the above described device for supporting a child. The undercarriage of the device corresponds here to a wheel-bearing undercarriage of the pushchair and the upper carriage of the device corresponds to a push bar of the pushchair.

In an embodiment of the present invention the above mentioned third arm and fourth arm are push bars for pushing along the pushchair, and the first and second arms are provided with wheels. These wheels can be connected to the first or the second coupling housing and can take a swivelling form. The upper carriage of the pushchair can further be connectable or be connected to a child's seat which is preferably collapsible in the first direction.

The device likewise provides a high chair comprising the above described device for supporting a child.

In an embodiment of the present invention the first arm and the second arm form girders for supporting the high chair on a ground surface, and the third and fourth arm are uprights which are connectable or are connected to a seat part. This seat part can likewise be collapsible in the first direction.

The invention also provides a child's bed comprising the above described device for supporting a child.

In an embodiment of the present invention the child's bed comprises at least two of the said devices for supporting a child, wherein the third and fourth arm of each device are disposed vertically in the position of use, and wherein the first and second arms of the at least two devices are fixedly connected to each other such that the transverse connections, the first arms and the second arms form a rectangular structure in which a mattress can be placed. The child's bed can be folded down by rotating the uprights in the direction of the first and second arms. The distance between the pair of first arms and the pair of second arms hereby become smaller. The mattress must first be taken out of the child's bed before rotation. These types of mattress are usually designed as a series of pivotally coupled mattress parts. This creates the possibility, after collapsing the child's bed, of folding the mattress around the child's bed and transporting it as one package. The child's bed can also be provided with a fold-down or fold-up screen tensioned between the third and fourth arms. The child is hereby safe in the child's bed and the child cannot easily leave the child's bed.

The invention will be discussed in more detail hereinbelow with reference to the accompanying figures, wherein.

Figure 1:
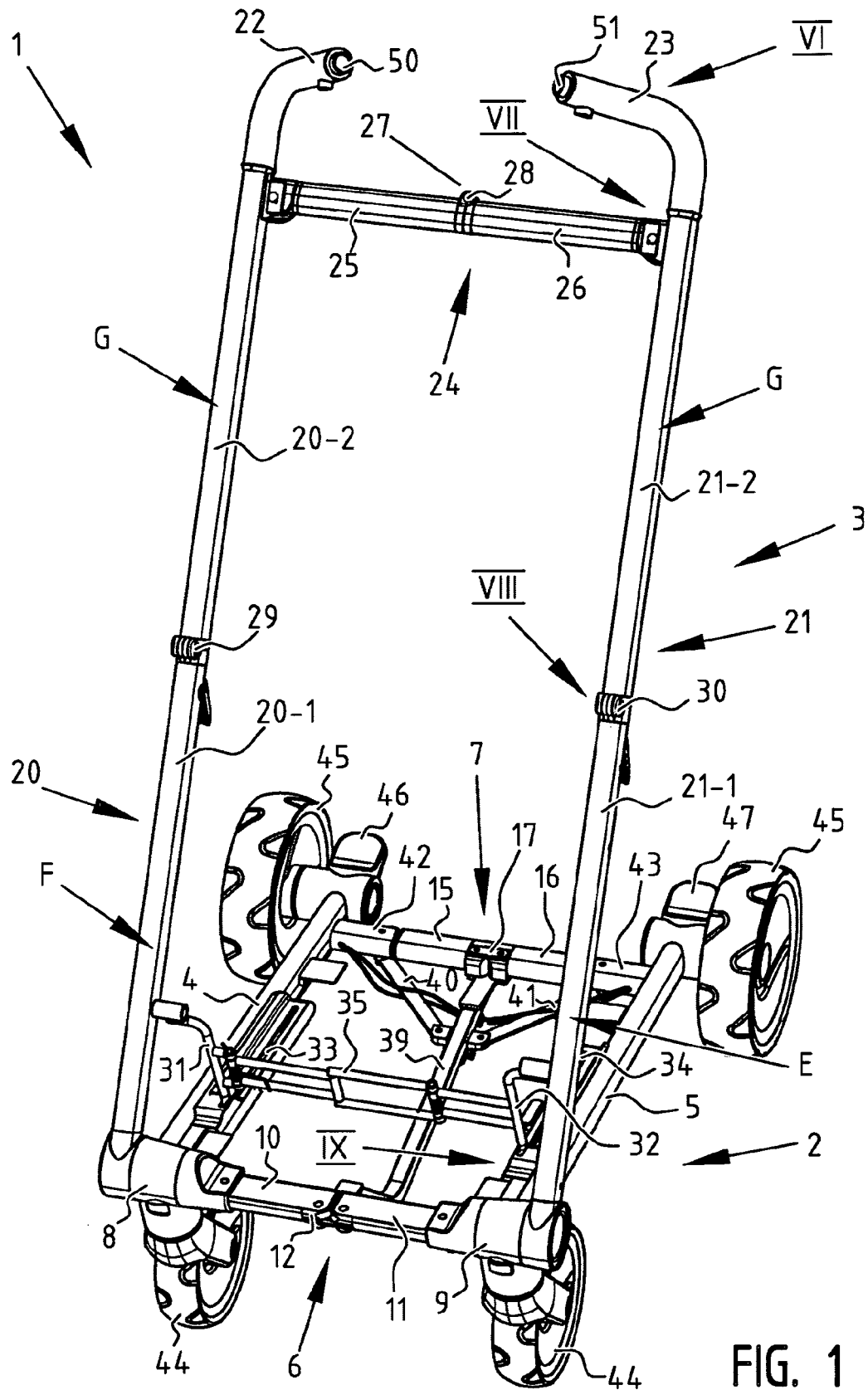
FIG. 1 shows an embodiment of a pushchair according to the invention in the position of use.
Figure 12:
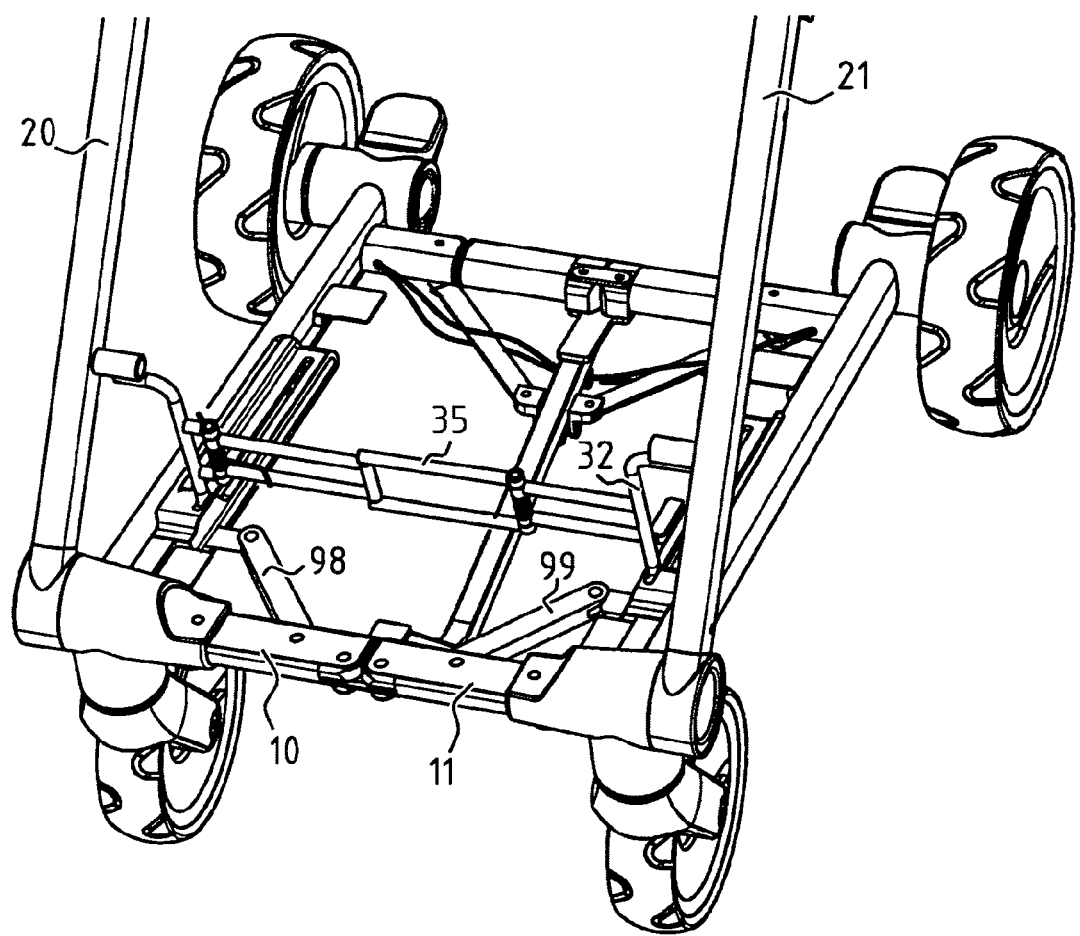
Figure 13A:
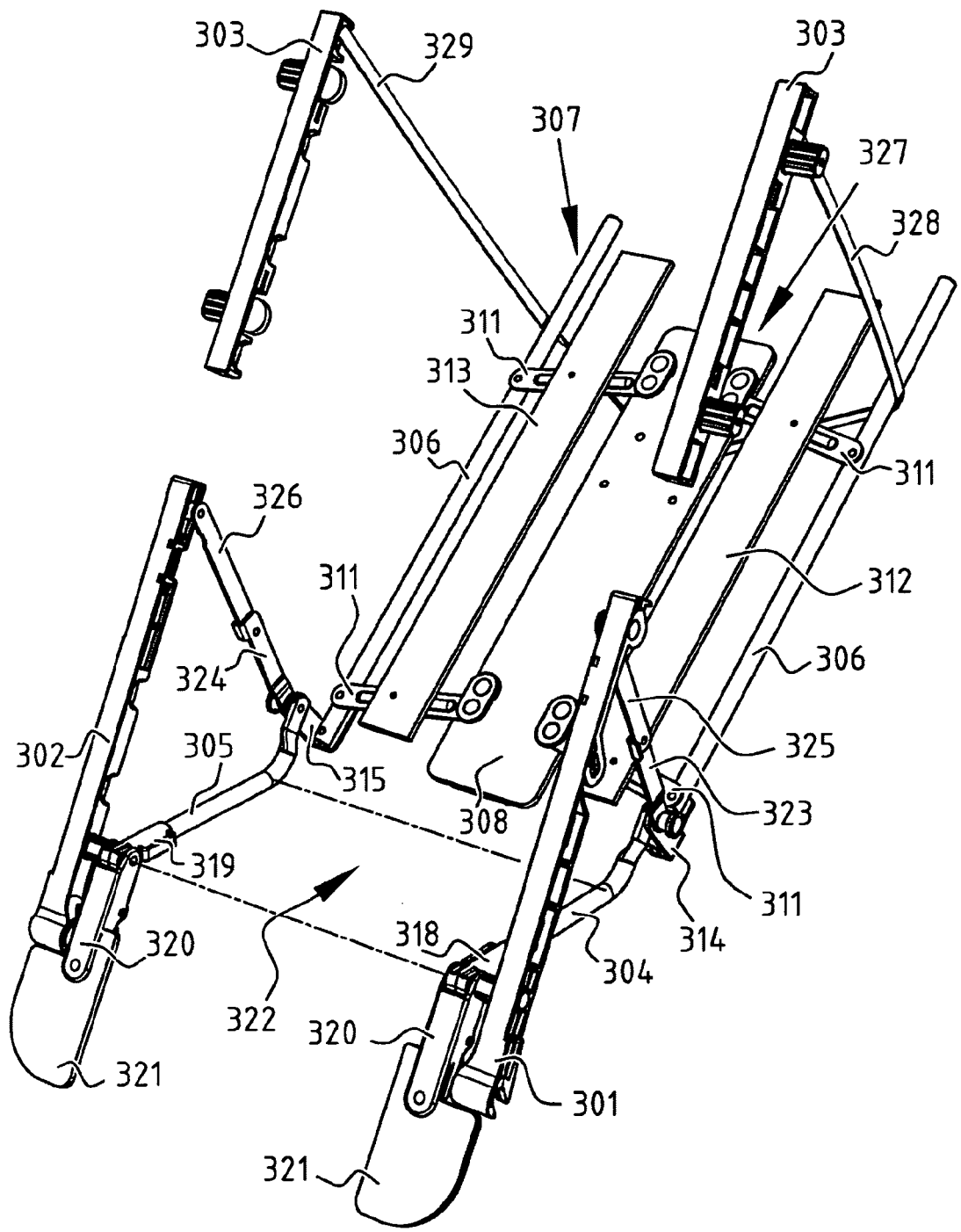
Figure 13B:
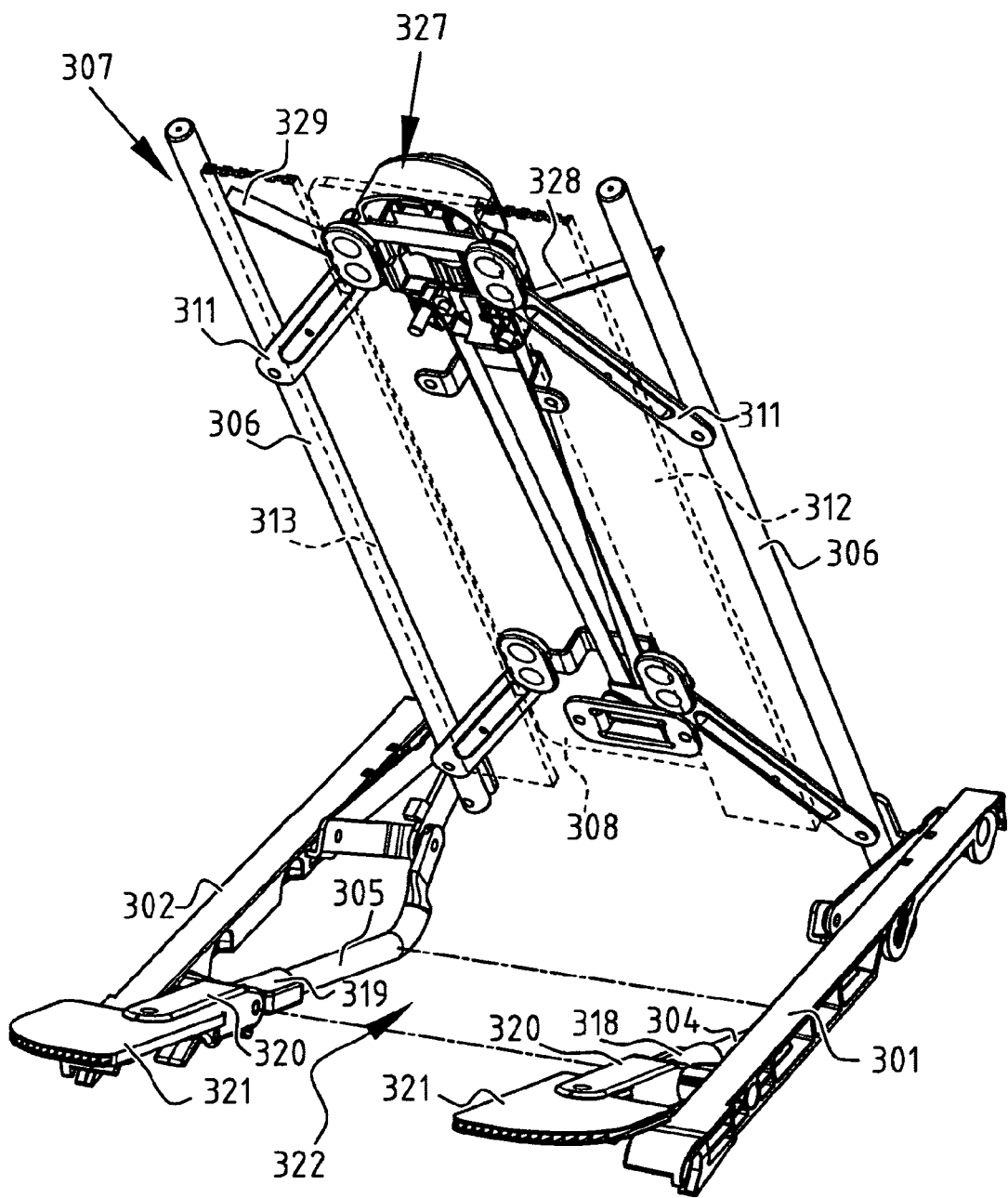
Figure 13C:
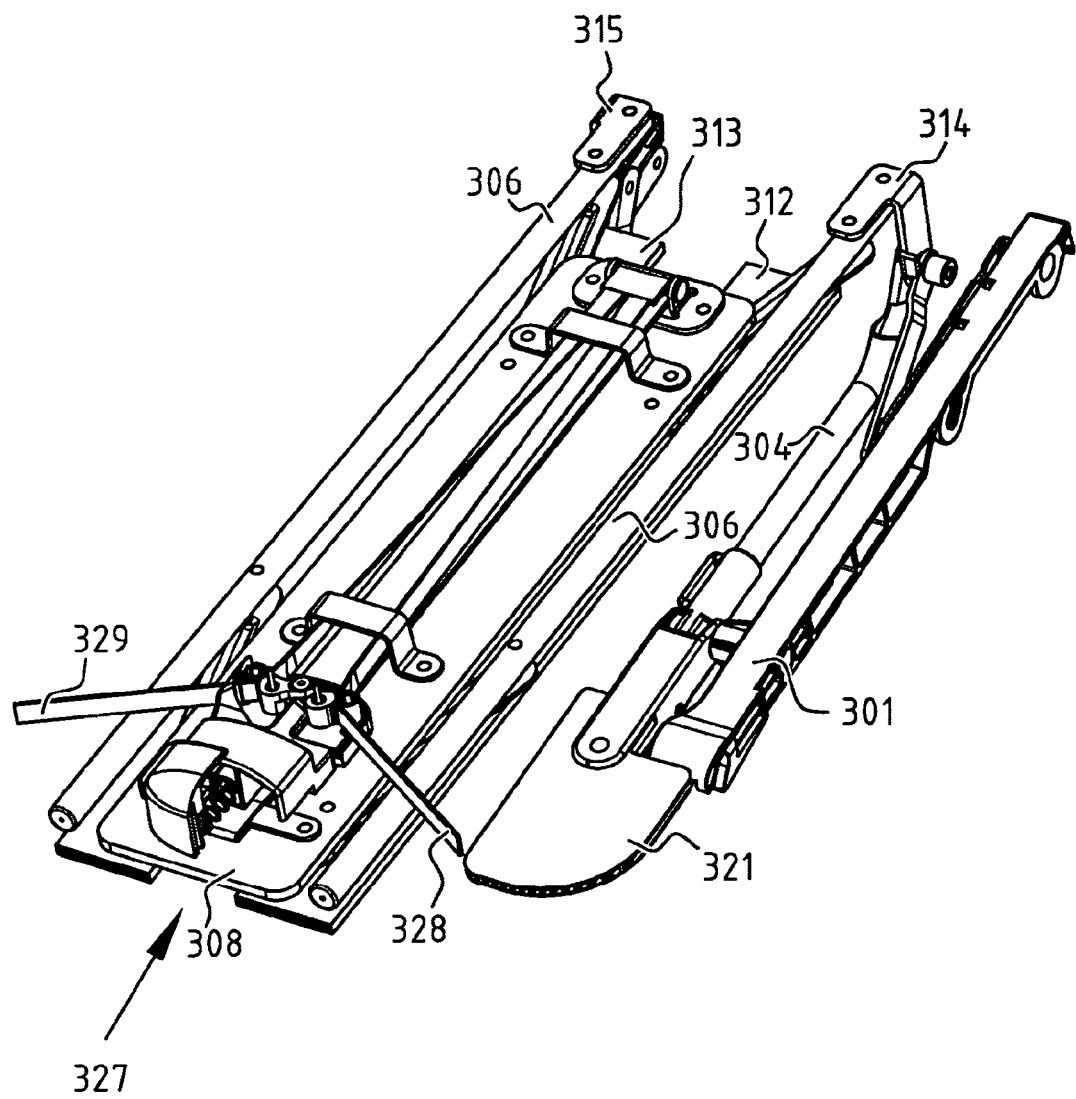
Figure 14:
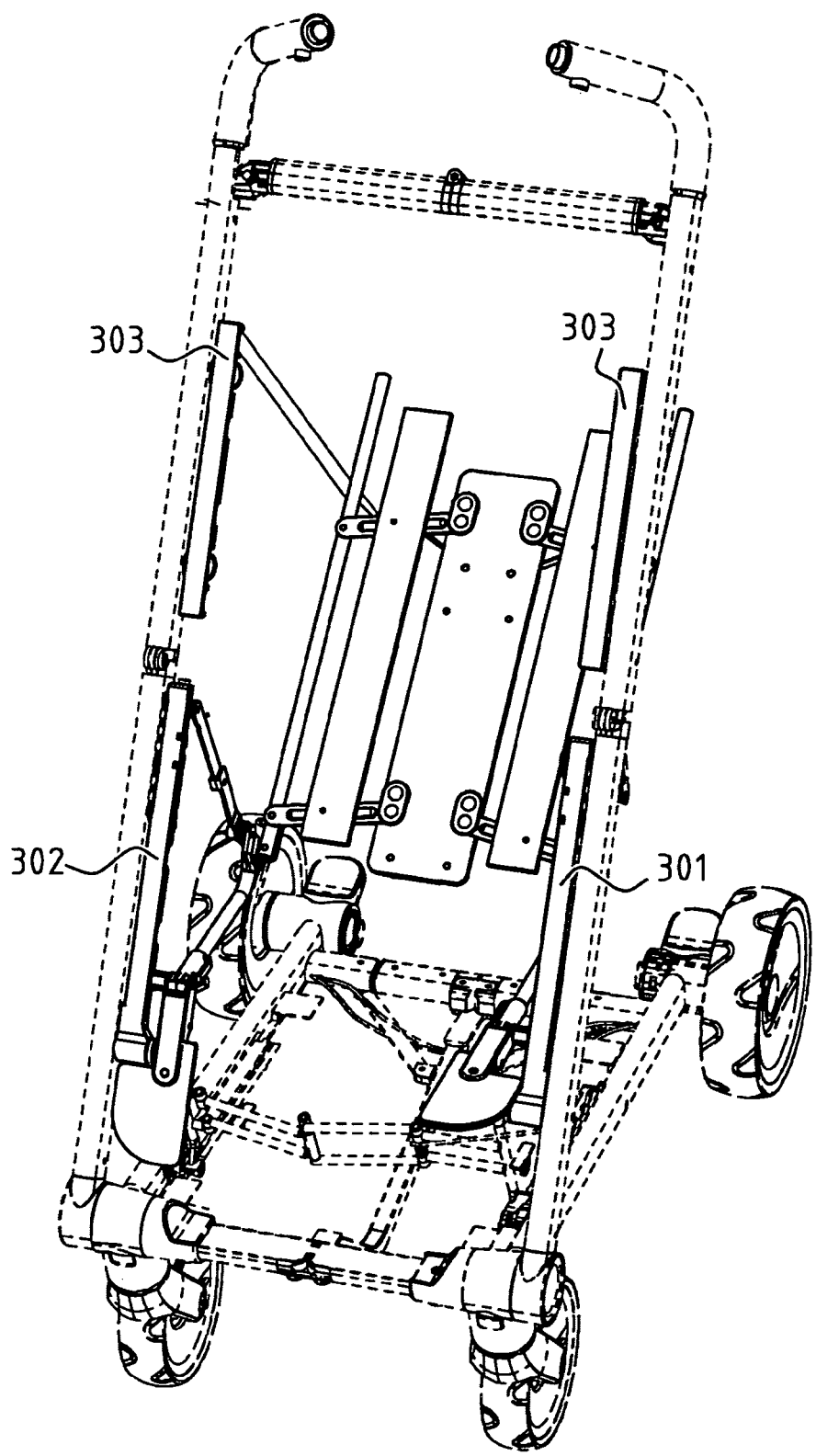
Figure 15:
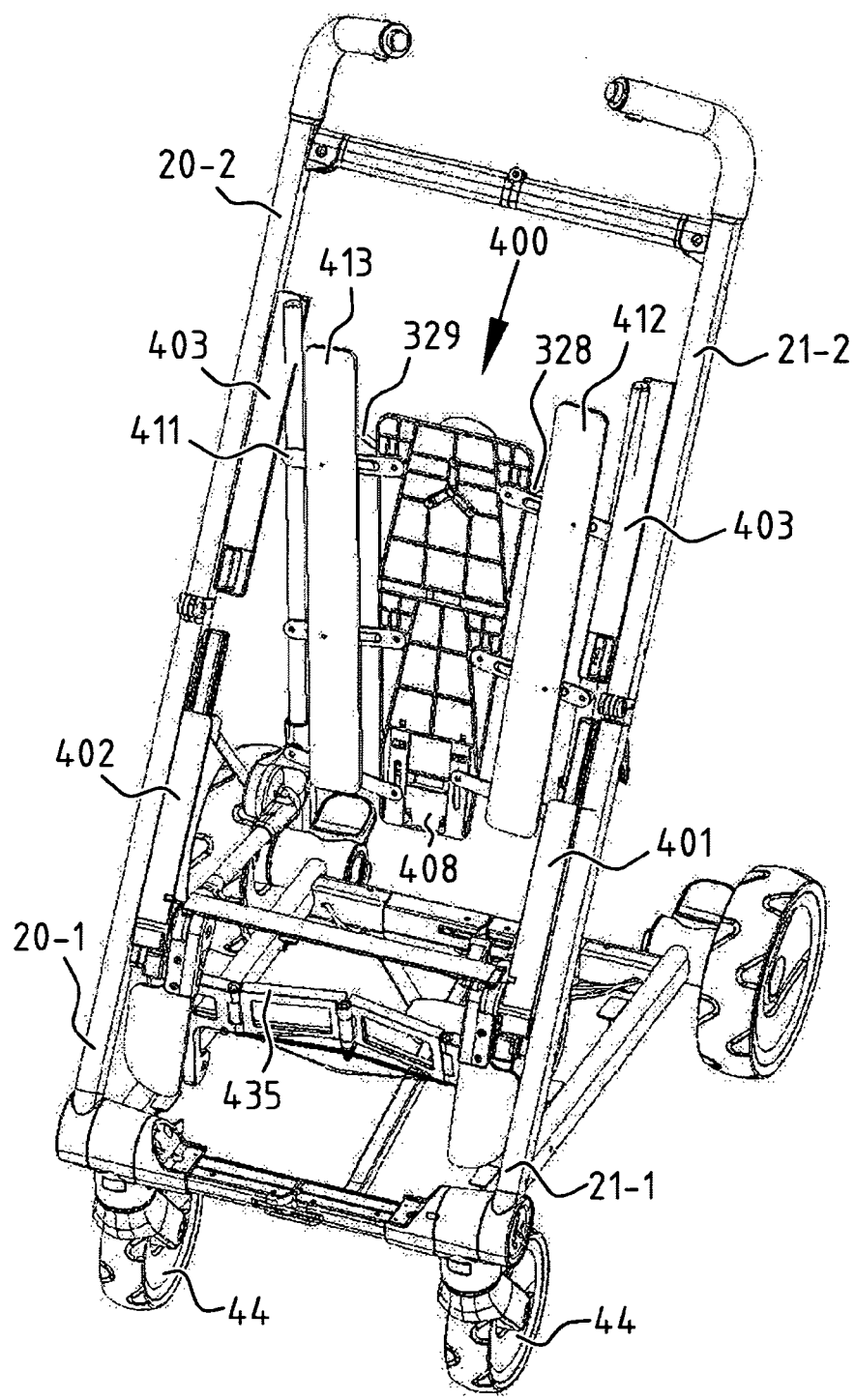
Figure 16:
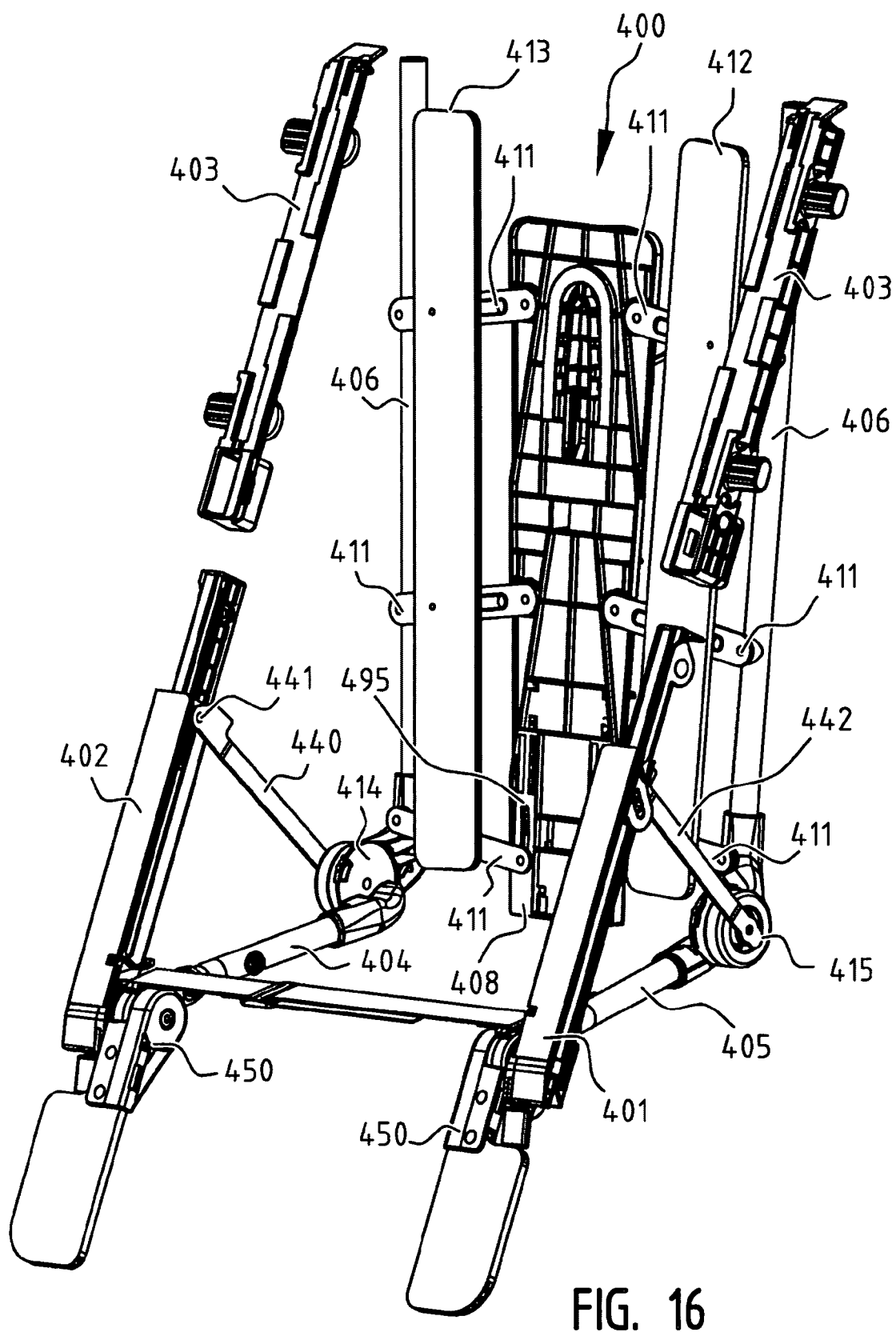
Figure 17:
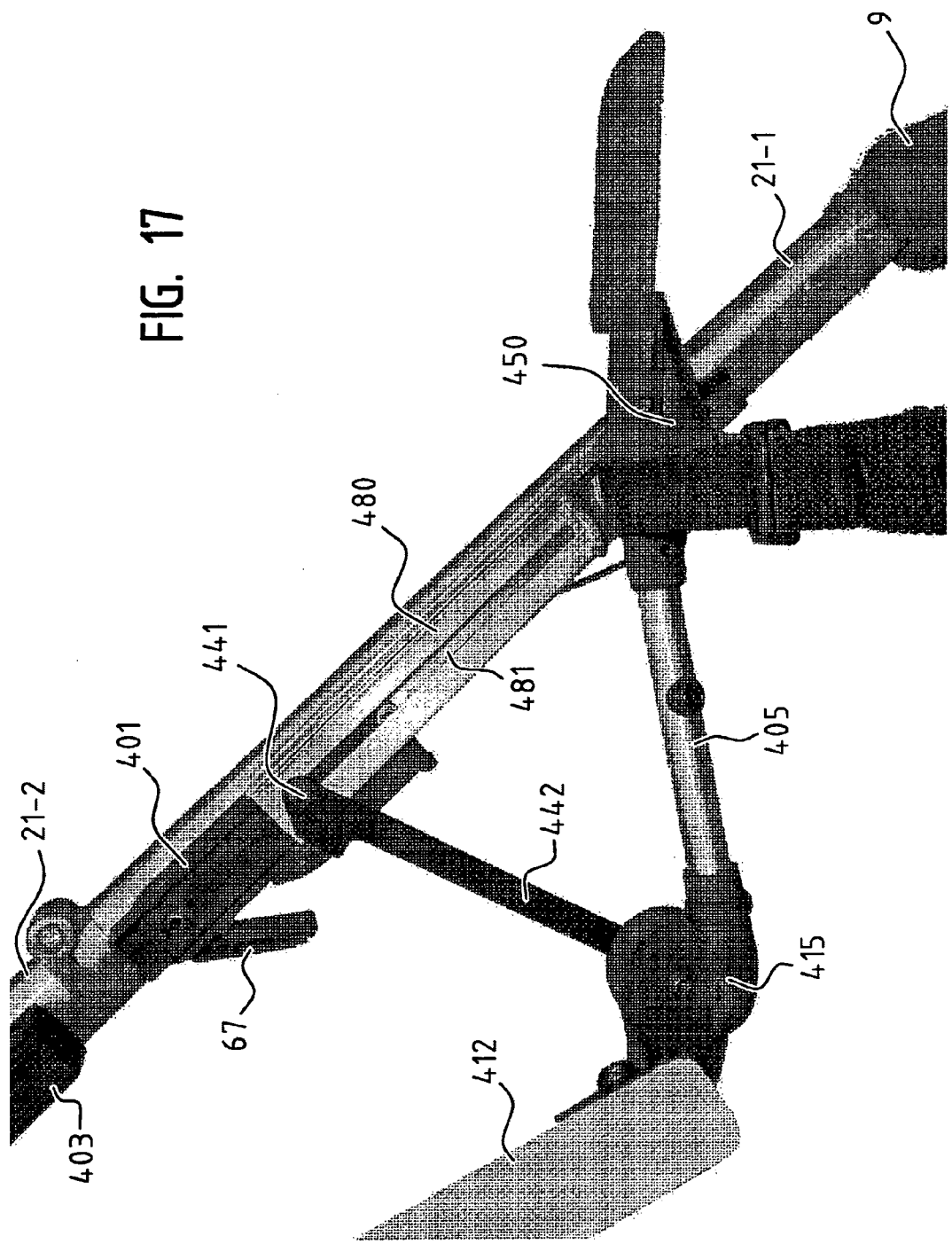
Figure 18:
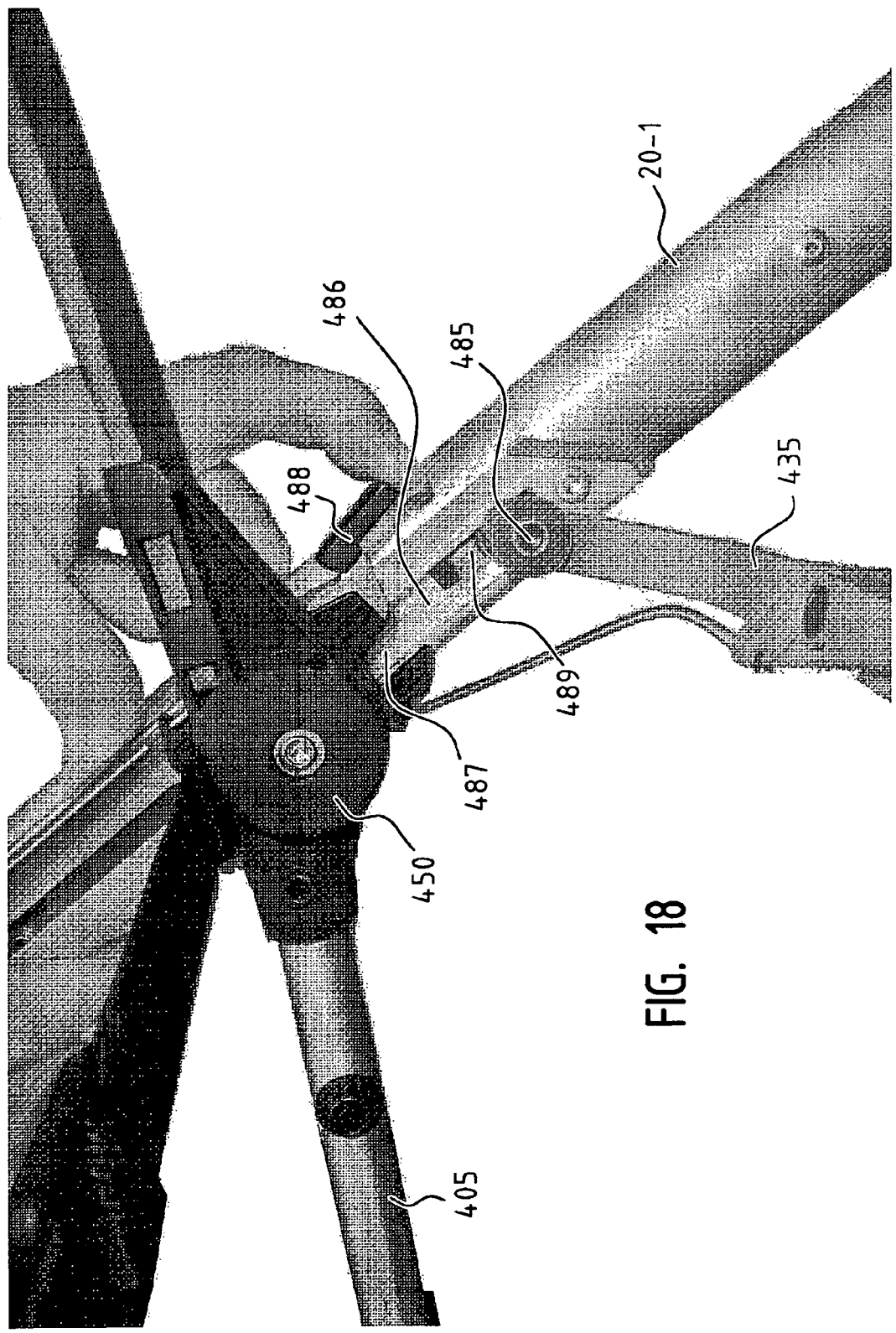

FIGS. 10A-B show an embodiment of a high chair according to the invention in respectively a position of use and collapsed position;

FIGS. 11A-C show an embodiment of a child's bed according to the invention in a position of use and collapsed position;

FIG. 12 shows an alternative embodiment to the embodiment of FIG. 1;

FIGS. 13A-C show an embodiment of a child's seat for the pushchair of FIG. 1;

FIG. 14 shows the mounting of the child's seat of FIG. 13A in the pushchair of FIG. 1;

FIG. 15 shows a further embodiment of a pushchair according to the invention;

FIG. 16 shows a child's seat for the embodiment of FIG. 15;

FIG. 17 shows a detail view of the coupling between the child's seat and the pushchair in the embodiment of FIG. 15; and FIG. 18 shows the coupling between the child's seat and the pushchair.

Figure 3:
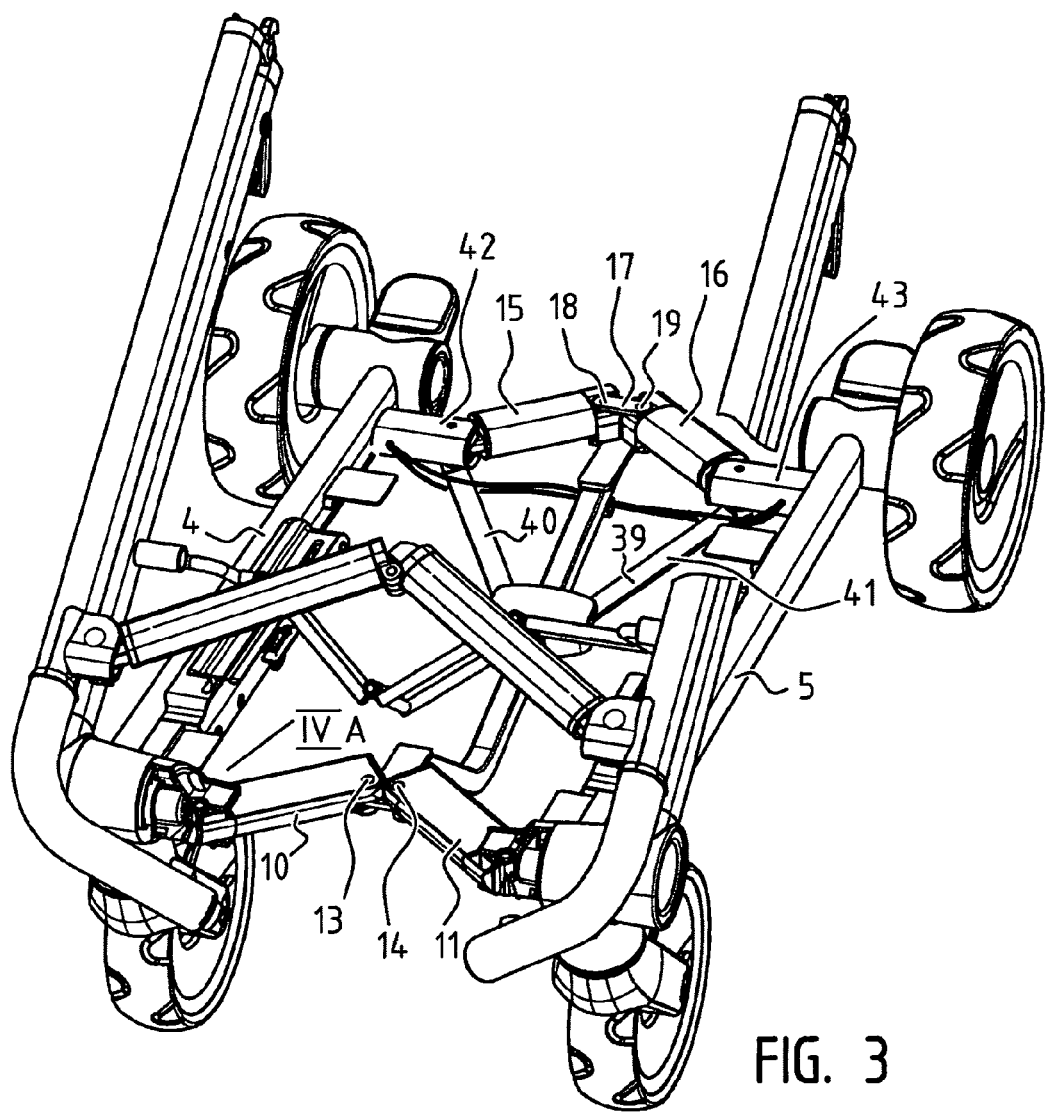
FIG. 3 shows the embodiment of FIG. 1 wherein the upper carriage is rotated toward the undercarriage.

FIG. 1 shows a pushchair 1 in which an embodiment of the device for supporting a child according to the invention is applied. Pushchair 1 comprises an undercarriage 2 and an upper carriage 3. Undercarriage 2 comprises a first arm 4 and a second arm 5 which are coupled by a transverse connection 6 and a further transverse connection 7. First and second arms 4, 5 comprise respectively a first and second coupling housing 8, 9. A first elongate part 10 of transverse connection 6 is pivotally connected to first coupling housing 8 such that this part can rotate in the plane of undercarriage 2. First elongate part 10 is also pivotally connected to a second elongate part 11 by means of a hinge element 12. Second elongate part 11 is pivotally connected at another end to second coupling housing 9. Transverse connection 6 can pivot as shown in FIG. 3 by means of two rotation axes 13, 14 on hinge element 12.

Further transverse connection 7 is embodied in similar manner as transverse connection 6. It comprises a first elongate part 15, a second elongate part 16 and a hinge element 17 with two rotation axes 18, 19. Further transverse connection 7 can hereby pivot in the plane of undercarriage 2 as shown in FIG. 3.

Figure 5:
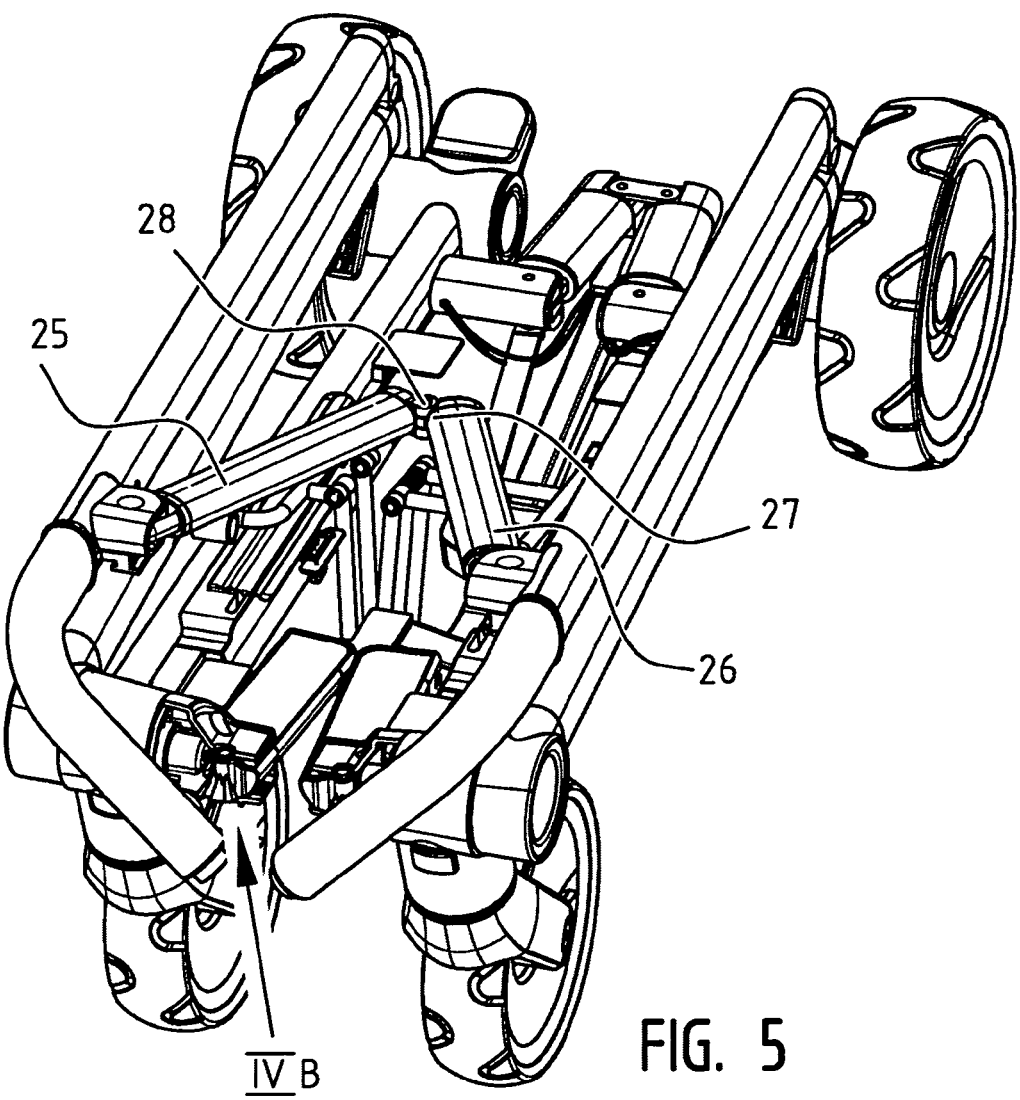
FIG. 5 shows the pushchair of FIG. 1 in collapsed position.

First and second coupling housings 8, 9 are pivotally coupled to respectively a third arm 20 and a fourth arm 21. Third arm and fourth arm 20, 21 are provided at an end with respectively a handgrip 22 and a handgrip 23. The third arm and fourth arm are mutually coupled by a further transverse connection 24. Further transverse connection 24 comprises a first elongate part 25 which is pivotally coupled to third arm 20 and a second elongate part 26 pivotally coupled to fourth arm 21. Both parts are coupled pivotally to each other by means of a hinge element 27 which enables rotation about an axis 28. Further transverse connection 24 can hereby pivot as shown in FIG. 5. The entity of third arm 20, fourth arm 21 and further transverse connection 24 forms upper carriage 3.

Figure 2:
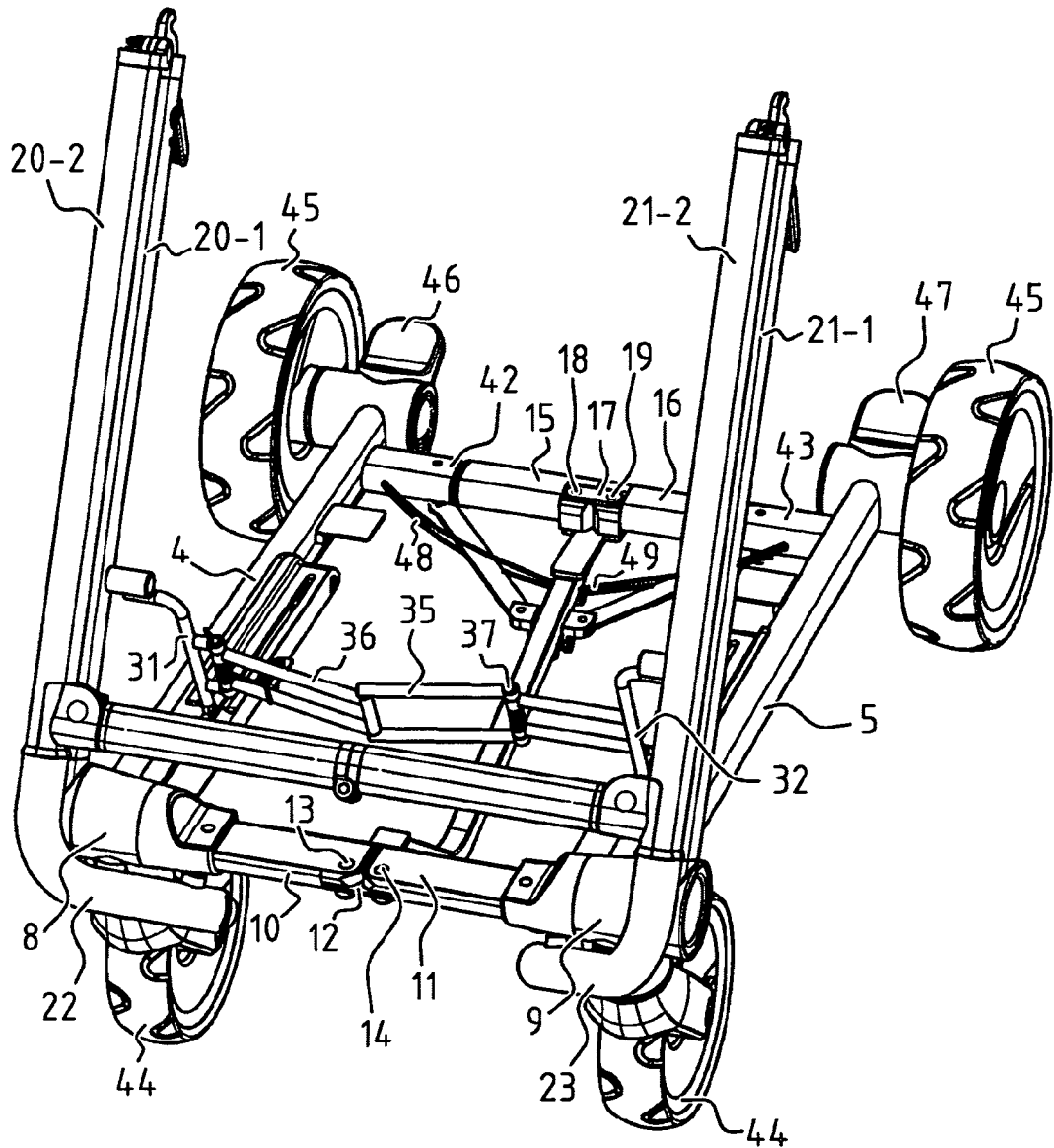
FIG. 2 shows the embodiment of FIG. 1 with folded-down push bars.

Third arm 20 comprises two arm parts 20-1, 20-2 which are pivotally coupled to each other by hinge 29. In similar manner fourth arm 21 comprises two arm parts 21-1, 21-2 which are pivotally coupled to each other by hinge 30. Arm parts 20-2, 21-2 can hereby rotate relative to respective arm parts 20-1, 21-1 as shown in FIG. 2. Arm parts 20-1, 21-1 here form a first upper carriage part and arm parts 20-2, 21-2 form a second upper carriage part.

Undercarriage 2 and upper carriage 3 are coupled by connecting arms 31, 32. Connecting arm 31 is coupled pivotally to third arm 20 and coupled pivotally and slidably to first arm 4. This latter coupling is made possible in that connecting arm 31 is coupled pivotally at the end directed toward first arm 4 to a carriage (not shown) which can itself slide in a slot 33. In similar manner connecting arm 32 is coupled pivotally at the end directed toward second arm 5 to a carriage (not shown) which itself can slide in a slot 34.

Connecting arms 31, 32 are mutually coupled by a pivotable bar construction 35. This bar construction 35 comprises a plurality of tube parts 36 which are coupled pivotally to each other by hinges 37, see FIG. 9. Bar construction 35 is biased by torsion springs 38. Bar construction 35 hereby forms a stiff structure in the position of use as shown in FIG. 1. Bar construction 35 has a dead centre. When bar construction 35 is moved or pivoted beyond this centre, it no longer forms the stiff structure of FIG. 1 but becomes collapsible in a first direction as shown in FIGS. 2 and 3.

Transverse connection 6 and further transverse connection 7 are coupled by an arm 39 which is pivotally connected to two side arms 40, 41. Side arms 40, 41 are in turn connected pivotally to spacer pieces 42, 43 of first arm 4 and second arm 5 respectively. Spacer pieces 42, 43 provide for substantially equal distances between the pivot points of transverse connections 6, 7 and associated arms 4, 5.

First and second coupling housings 8, 9 are connected to front swivel wheels 44. At a rear end first and second arms 4, 5 are connected to rear wheels 45 which generally do not take a swivelling form. A per se known brake mechanism can be activated by operating foot pedals 46, 47. This mechanism comprises toothed structures which can mutually engage (not shown). Because one toothed structure is connected to the rotation axis of rear wheel 45, this wheel can be braked. The brake mechanism of both rear wheels 45 is coupled mechanically by cables 48, 49. This achieves that both rear wheels 45 are blocked when only one pedal 46, 47 is operated.

The operation of pushchair 1 will be discussed in detail below. The starting point here is the position of use as shown in FIG. 1.

FIG. 1 shows two push-buttons 50, 51. Cables 52 running in third arm 20 and fourth arm 21 are moved by operating these buttons, see FIGS. 6-8. Cable 52 comprises a sheath 53 and a cable core 54 received therein. Cable core 54 is mounted on a roll 55 which can rotate about axis 56 relative to fourth arm 21 but which cannot translate. Before push-button 51 can be operated it must be released. This takes place by moving unlocking element 57 to fourth arm 21. Recess 58 hereby comes to lie in line with a protrusion 59 of push-button 51. Push-button 51 can hereby move in fourth arm 21. A body 60 is moved downward by this movement. This is possible because body 60 comprises a slot (not shown) for axis 56. At the end of body 60 cable core 54 is connected fixedly at point 61. Cable core 54 thus runs round roll 55. A further body 62 is fixedly connected to fourth arm 21. Body 62 fixes sheath 53 relative to fourth arm 21. Further arranged is a spring 63 which pushes body 60 away relative to body 62. When body 60 is now moved downward by push-button 51 being operated, the end point 61 of cable core 54 will move downward. A cable core 54 can hereby be pulled effectively.

Figure 8:
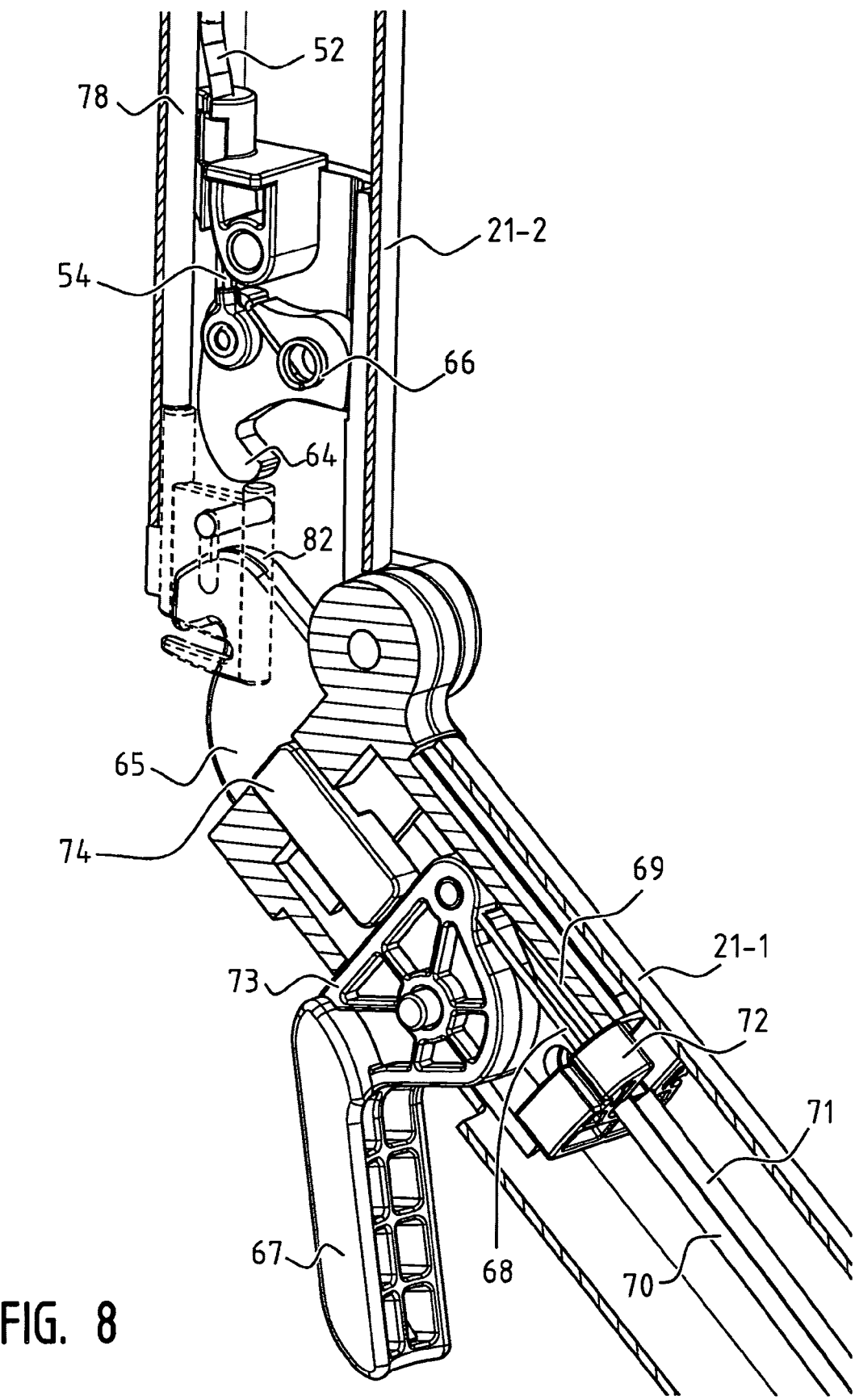
FIG. 8 shows a cross-section of the pushchair of FIG. 1 at the position of the pivot point of the upper carriage parts.

FIG. 8 shows the pivot point between arm parts 21-1 and 21-2 in the uncoupled position. Coupling between arm parts 21-1 and 21-2 is made possible by hooks 64, 65. In FIG. 8 hook 64 is rotated upward by the movement of cable core 54. Hook 64 is otherwise tensioned by torsion spring 66 such that it tends to rotate to a position in which hook 65 can be engaged. Because cable core 54 has uncoupled hooks 64, 65, arm parts 21-1 and 21-2 can pivot relative to each other.

Arm part 21-1 is provided with a handle 67 which is connected to cable cores 68, 69 of cables 70 and 71 respectively.

The sheaths of these cables are fixed relative to arm part 21-1 by means of element 72. Cable cores 68, 69 are pulled by rotating the handle 67 about axis 73. Handle 67 must however be released before it can be operated. A blocking means 74 is received in arm part 21-1. In the position of use of FIG. 1 blocking means 74 lies fixedly enclosed between arm parts 21-1 and 21-2, whereby handle 67 cannot be operated. After uncoupling of arm parts 21-1 and 21-2 and after pivoting of these parts the blocking means 74 can move freely, whereby handle 67 can then be operated.

The movement of further transverse connection 24 will now be discussed with reference to FIGS. 7 and 8.

Figure 7:
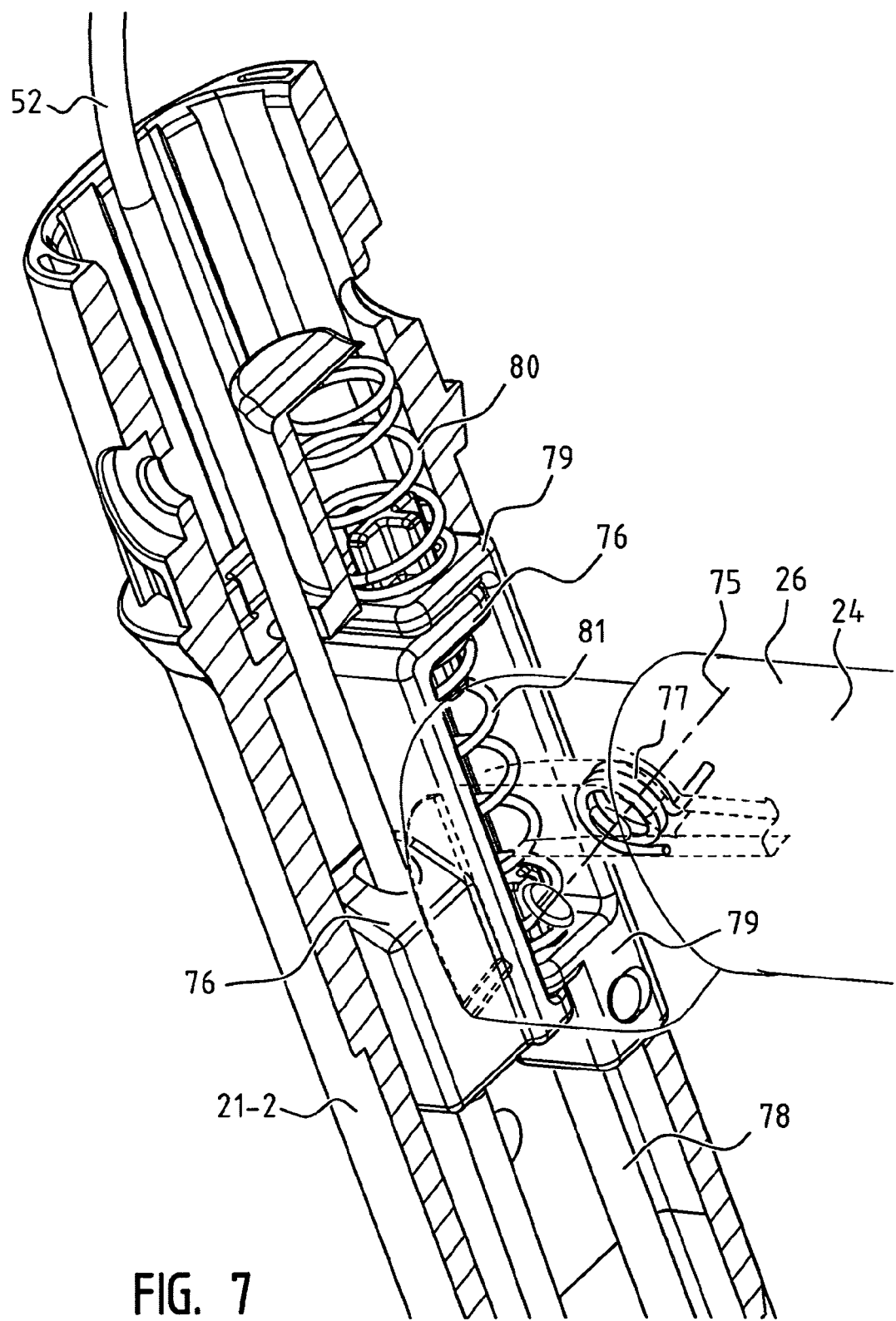
FIG. 7 shows a cross-section of the pushchair of FIG. 1 at the position of the further transverse connection in the upper carriage.

FIG. 7 shows arm part 21-2 at the position of further transverse connection 24. Elongate part 26 of transverse connection 24 is connected pivotally to arm part 21-2 such that part 26 can rotate about axis 75. In the situation shown in FIG. 7 however, this rotation is not possible because elongate part 26 lies against a locking element 76. This element has a cavity for passage of cable 52. Movement of locking element 76 does not affect cable 52, or hardly so. Elongate part 26 is provided with a torsion spring 77 which urges elongate part 27 to rotate.

Arm part 21-2 comprises a rod 78 fixedly connected to a body 79. This body can translate in arm part 21-2 and is under spring tension of spring 18 which pushes body 79 downward. Received in body 79 is a further spring 81 which pushes locking element 78 upward relative to body 79.

FIG. 8 shows the situation in which rod 78 cannot move downward. This is because spring 80 has pushed body 79 downward. This in contrast to FIG. 7, where rod 78 is still in an upper position in which rotation of elongate part 26 is prevented. Both figures are therefore not correlated.

Shown in broken lines in FIG. 8 is a blocking means 82 which ensures that rod 78 cannot move downward. In the position of use blocking means 82 is enclosed between arm parts 21-1 and 21-2, whereby it slides upward over catch 83 and holds back rod 78. After uncoupling of arm parts 21-1 and 21-2 blocking means 82 can slide downward, whereby rod 78 can likewise move downward. Owing to the spring tension of spring 80 body 79 will move downward together with locking element 76. Elongate part 26 and locking element 76 are no longer in contact as a result, and elongate part 26 can pivot. Locking element 76 can move relative to body 79. Locking element 76 can hereby move in downward direction even when body 79 is locked in its position by rod 78 and blocking means 82 when arm parts 21-1 and 21-2 are recoupled to each other after the frame has been moved from the collapsed position to the position of use. Elongate parts 25 and 26 of transverse connection 24 will once again be brought into line so as to increase the stiffness of the upper carriage in the transverse direction. Elongate part 26 presses here against the inclining surface of locking element 76, whereby locking element 76 moves downward counter to the spring tension of spring 81. When elongate part 26 is situated in the position of use, it will no longer make any contact with locking element 76, and locking element 76 will move to its locking position by the spring tension of spring 81.

Figure 6:
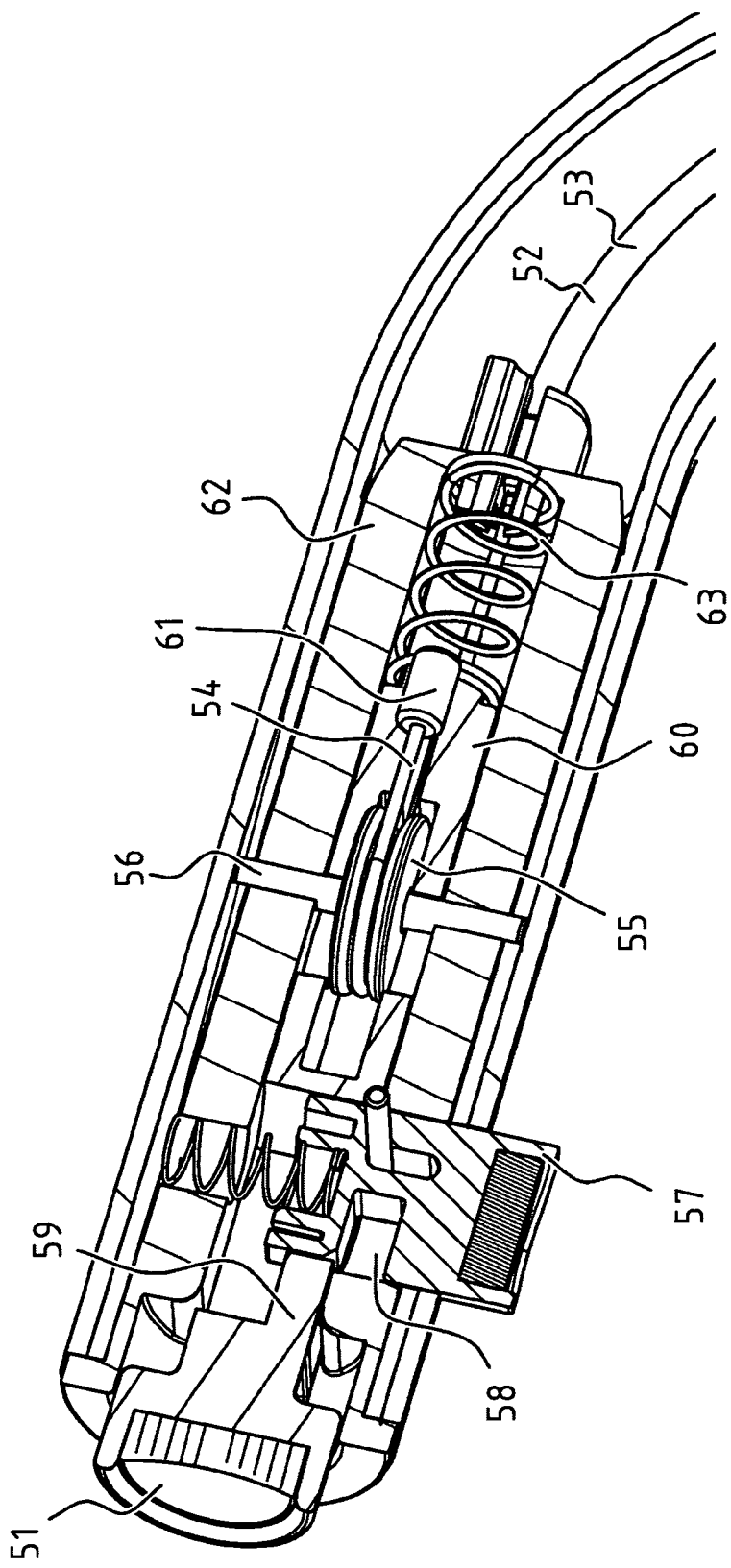
FIG. 6 shows a cross-section of the pushchair of FIG. 1 at the position of a handgrip of the pushchair.

It will be apparent to the skilled person that embodiments of a pushchair other than the embodiment shown in FIG. 1 are possible. The present invention expressly does not preclude for instance an embodiment wherein the transverse connection 24 is used as push element instead of the handgrips 22, 23 shown in FIG. 1. In such an embodiment the functional part of handgrips 22, 23 as shown in FIG. 6 will be at least partially received in transverse connection 24.

The functionality of undercarriage 3 will now be discussed with reference to FIGS. 4A, 4B and 9.

Figure 9:
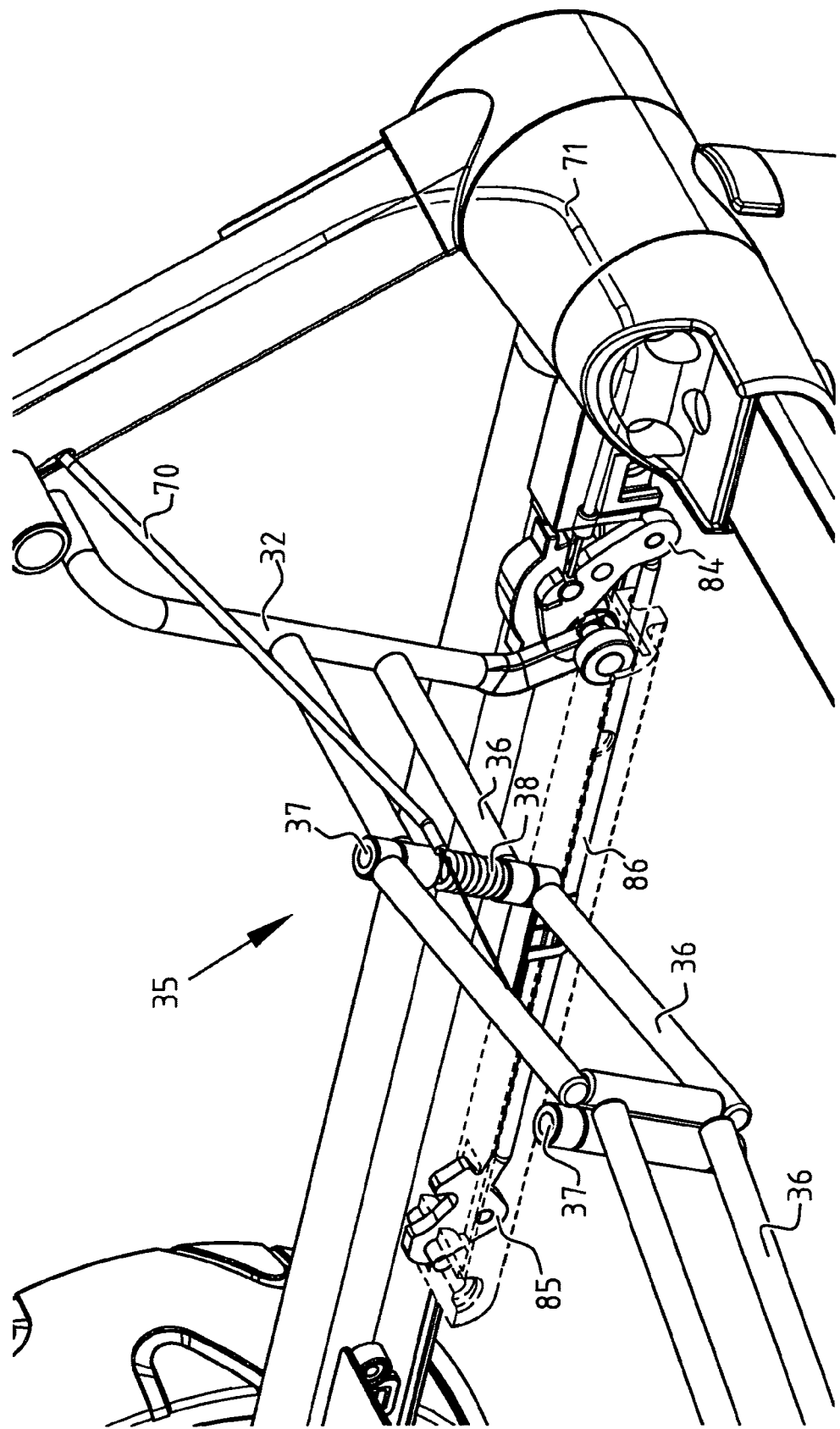
FIG. 9 shows a partially cut-away detail view of the pushchair of FIG. 1 at the position of the second coupling housing.

Shown in FIG. 9 is that cable 71 is connected to a hook 84. This hook engages on the pivot point of connecting arm 32. FIG. 9 therefore shows a situation in which the pivot point of connecting arm 32 cannot translate in slot 34. Upper carriage 3 cannot therefore rotate to undercarriage 2 and pushchair 1 cannot be collapsed, as will be elucidated below. Further shown is a hook 85 with which the pivot point can be locked when pushchair 1 has been fully collapsed. Both hooks 84, 85 are coupled by rod 86 and can therefore both be operated with handle 67.

As described below, the sliding of the pivot point of connecting arm 32 is linked in non-releasable manner to the collapsing of pushchair 1 in a transverse direction. The sliding of the pivot point will therefore have to go together with collapsing of bar construction 35. This takes place by means of cable 70, which pulls bar construction 35 through its dead centre. Since this takes place simultaneously with the translation of the pivot point, pushchair 1 can be collapsed.

Figure 4A:
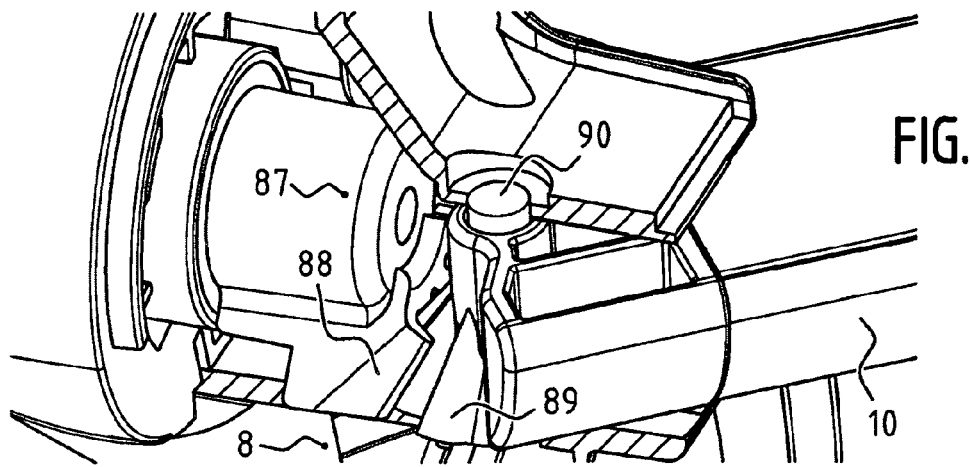
FIG. 4A is a partially cut-away detail view of the coupling housing of FIG. 1.
Figure 4B:
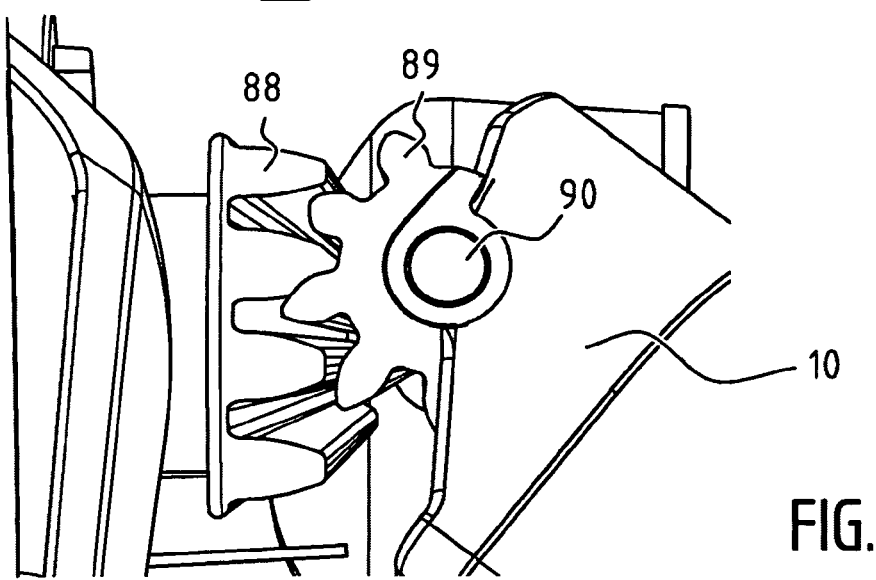
FIG. 4B is the associated bottom view.

FIGS. 4A and 4B show in detail the first coupling housing 8. Shown here is an axis 87 which is fixedly connected to arm part 20-1 and supported in optionally bearing-mounted manner in coupling housing 8. As upper carriage 3 rotates to undercarriage 2, axis 87 will rotate. A toothed wheel part 88 is connected fixedly to axis 87 at the end of axis 87. Toothed wheel part 88 engages on a toothed wheel part 89 disposed perpendicularly of toothed wheel part 88. Toothed wheel part 89 is connected fixedly to first elongate part 10 of transverse connection 6. Toothed wheel part 89 can rotate here about an axis 90. As a result the first elongate part 10 is therefore also rotatable about axis 90.

As upper carriage 3 rotates toward undercarriage 2, axis 87 will cause first elongate part 10 to pivot by means of the geared transmission. An identical mechanism is arranged on the other side of pushchair 1, i.e. at second coupling housing 9. Transverse connection 6 will hereby pivot as shown in FIG. 3. Owing to the coupling between transverse connection 6 and further transverse connection 7, this latter will also pivot.

Collapsing of pushchair 1 can thus be summarized as follows. As first step locking elements 57 are operated so that arm parts 20-1 and 20-2 and arm parts 21-1 and 21-2 are uncoupled by means of push-buttons 50, 51. Arm parts 20-2 and 21-2 are then pivoted forward such that handgrips 22, 23 move into the vicinity of front wheels 44, see FIG. 2. Further transverse connection 24 hereby becomes pivotable in the transverse direction of pushchair 1. It hereby also becomes possible to operate handles 67. Through operation hereof the bar construction 35 becomes collapsible and the pivot point of connecting arms 31, 32 is uncoupled such that it can slide in respective slots 33, 34. As a result the user can rotate the whole upper carriage 3 to undercarriage 2, see FIG. 3. Owing to this rotation the transverse connection 6 will pivot due to the geared transmission, whereby pushchair 1 will collapse in transverse direction. Transverse connections 7 and 24 here follow the pivoting movement of transverse connection 6. Pushchair 1 is finally in the collapsed position as shown in FIG. 5.

Although not drawn, pushchair 1 can be coupled in usual manner to a cot or car seat for a child. Such a component can also be given a collapsible form, this such that the component can remain connected to pushchair 1 during collapsing. A car seat is for instance at least collapsible here in the transverse direction. A car seat or cot can usually be coupled to third and fourth arm 20, 21.

The application of the device for supporting a child according to the invention is described in the foregoing in respect of pushchairs. The invention is not however limited to pushchairs. FIGS. 10A and 10B thus show the application in a high chair and FIGS. 11A-11C show the application in a carrycot.

FIG. 10A shows a high chair 101. This comprises a first arm 104, a second arm 105, a transverse connection 106 and a further transverse connection 107. These elements form a support service for high chair 101. High chair 101 further comprises a third arm 120 and a fourth arm 121. These arms are telescopically extendable. They are connected to a seat part 190. This part comprises armrests 191 which can pivot by means of hinges 192, 193. An underside of seat part 190 is further connected pivotally to third and fourth arm 120, 121 by means of a hinge 194.

High chair 101 can be collapsed as follows. The elements of FIG. 10A here have the same function as similar elements in FIGS. 1-9. Armrests 191 are first unlocked, whereby they can pivot. The seat part is then moved forward. This unlocks the telescopic arms 120, 121, as a result of which seat part 190 can be carried downward. This telescopic movement unlocks the transmission between third arm 120 and first arm 104 and between fourth arm 121 and second arm 105. Highchair 101 can accordingly be collapsed in both the transverse direction and the vertical direction.

FIG. 11A shows a child's bed 201 in the position of use. Child's bed 201 comprises a first arm 204, a second arm 205, a third arm 220, a fourth arm 221 and transverse connections 206. The elements of FIG. 11A have the same function as similar elements in FIGS. 1-9.

In order to collapse child's bed 201, third and fourth arms 220, 221 are first rotated in the direction of first and second arms 204, 205 as according to arrow A. Transverse connections 206 will hereby begin to pivot, whereby the collapsed position as shown in FIG. 11C is obtained. Child's bed 201 can further be provided with netting 295 for the purpose of protecting a child.

In the embodiments shown up to this point a geared transmission has been used for the purpose of converting the rotation movement of upper carriage and undercarriage to a collapsing movement of the undercarriage, and optionally also the upper carriage. The invention is however not limited thereto.

FIG. 12 shows an alternative to the geared transmission. In this figure the same numbering is employed as in FIG. 1. The great difference however from the embodiment of FIG. 1 is that in FIG. 12 there is no geared transmission. Coupling arms 98, 99 are placed instead. Coupling arm 98 is pivotally connected here to connecting arm 31 and pivotally connected to first elongate part 10. Coupling arm 99 is pivotally connected to connecting arm 32 and pivotally connected to second elongate part 11. In this embodiment it is the connecting arms 31, 32 which cause transverse connection 6 to pivot by means of coupling arms 98, 99 as a result of rotation of upper carriage to undercarriage. This form of transmission is however also direct. This is because there is a series of mechanical components which directly connect the transverse connection to the relative rotation movement of undercarriage and upper carriage.

FIGS. 13A-13C show an embodiment of a child's seat 300 for the pushchair of FIG. 1. The seat comprises insert parts 301, 302, 303 with which the seat is attached to upper carriage 3 of pushchair 1, see FIG. 14. Insert parts 303 are attached to arm parts 20-2, 21-2 at the locations indicated by arrows G. Insert parts 301, 302 are attached to arm parts 20-1, 21-1 at the locations indicated by respective arrows E, F. Seat 300 further comprises a back surface 307, a seat surface 322, a leg support including adjustment, rods 323, 324, 325, 326 for supporting seat 300, and adjusting knob 327 and two pieces of non-elastic band 328, 329.

Seat surface 322 comprises a piece of fabric (shown with broken lines) tensioned between seat rods 304 and 305. The width of upper carriage 3 ensures that seat surface 322 is tensioned.

Back surface 307 comprises tubes 306 mounted non-pivotally on brackets 314 and 315. Brackets 314 and 315 are connected pivotally to respective seat rods 304 and 305. The support of the back is further formed by panel 308 which is connected with rods 311 to tubes 306. Additional panels 312 and 313 are attached to rods 311 in order to provide the back of the child with a wider support. Back surface 307 is further supported by non-elastic bands 328, 329 which join together on the rear of seat 300. At the location where bands 328, 329 join together a provision 327 is made for locking the bands so that back surface 307 can be placed in different positions.

A leg support is attached to seat rods 304 and 305 on each side of seat 300. This leg support comprises a fixing part 318, 319 on which a leg support adjustment 320 is mounted. A panel 321 is attached to leg support adjustment 320. Provided on the rear side of leg support adjustment 320 is a knob for setting the height of the leg support. These knobs lock the leg support automatically when it is moved upward.

Rods 323, 324, 325, 326 provide for folding in and out of seat 300 together with upper carriage 3. Rods 323 and 325 and rods 324 and 326 are pivotally connected to each other here, rods 323 and 324 are pivotally connected to respective brackets 314 and 315, and rods 325 and 326 are pivotally connected to respective insert parts 301 and 302. Rods 323, 324, 325, 326 further ensure that seat surface 322 can no longer rotate forward when it is pulled.

Seat 300 is attached to upper carriage 3 by means of insert parts 301, 302, 303. Insert parts 303 are attached to arm parts 20-2 and 21-2 by means of recesses (not shown) in these arm parts 20-2 and 21-2. Insert parts 301 and 302 have recesses 330 which drop over connecting arms 31 and 32. Higher up insert parts 301 and 302 snap into a plastic part (not shown) on respective arm parts 20-1 and 21-1.

Because insert parts 303 are attached to arm parts 20-2 and 21-2, the forward rotation of arms 20-2 and 21-2 will, as part of the collapsing of pushchair 1, pull back surface 307 forward via insert parts 303 and non-elastic bands 328, 329. Because back surface 307 is pulled forward, brackets 314 and 315 likewise rotate forward. Added to brackets 314, 315 is a protrusion (not shown) which presses rods 323 and 324 forward. Since the upper pivoting point of rods 325, 326 is connected at a fixed point on upper carriage 3, this has the result that seat 300 moves upward as shown in FIG. 13B. In the situation as shown in FIG. 13B seat surface 322 lies parallel to third arms 20, 21 and back surface 307 lies on top of the further transverse connection 24. When arm parts 20-1 and 21-1 are now moved in the direction of undercarriage 2, undercarriage 2 and upper carriage 3 will become narrower via the geared transmission. Seat 300 is consequently also forced to become narrower. This is possible, among other reasons, because rods 311 are mounted pivotally on tubes 306 and panel 308. Panels 312, 313 can further slide at least partially over panel 308. The final collapsed position of child's seat 300 is shown in FIG. 13C.

FIG. 15 shows a further embodiment of a pushchair according to the invention. Also present in this embodiment is a child's seat 400 which is inserted by means of insert parts 401, 402, 403 into arm parts 20-1, 20-2, 21-1 and 21-2. Child's seat 400 is shown in more detail here in FIG. 16.

Child's seat 400 comprises a seat rod 404, 405 and a connecting arm 440, 442 which are connected to each other by a coupling part 414, 415. Connecting arm 440, 442 is pivotally coupled here to coupling part 414, 415 and pivotally coupled to insert part 402, 401 at pivot point 441 which is fixed relative to arm part 20-1, 21-1. One side of the pushchair will be discussed below. It will be apparent to the skilled person that the other side of the pushchair can be given an identical or substantially identical form.

Insert part 901 is coupled to a carriage 480 which is provided with a slot 481 in which pivot point 441 of connecting arm 442 is received. Carriage 480 can slide over insert part 401, see FIG. 17.

On the underside the bar construction 435 is received slidably in a slot 486 in arm 20-1 via a pivot point 485. Pivot point 485 can hereby slide upward during collapsing of the pushchair. It is noted here that in this embodiment the bar construction and the connecting arm between undercarriage and upper carriage are formed integrally. In other embodiments the pivot point is part of only the connecting arm.

In contrast to connecting arm 31 of the embodiment of FIG. 1, the connecting arm/bar construction of FIG. 15 is slidable in arm parts 20-1, 21-1 and not in the undercarriage. The connecting arm/bar construction is further connected pivotally to arm parts 20-1, 21-1 and to the undercarriage.

Child's seat 400 can be coupled to the frame by placing insert parts 401, 402, 403 in arm parts 20-1, 20-2, 21-1, 21-2 and connecting child's seat 400 to bar construction 435. Child's seat 400 is provided for this purpose at the position of coupling part 450 with a recess 487 which can engage on the cylindrically formed pivot point 485 of bar construction 435, see FIG. 18. A resilient hook 488 is further present to secure this connection. Coupling part 450 is also connected fixedly to carriage 480. Coupling part 450 is connected pivotally to seat rod 405.

When the pushchair is collapsed, pivot point 485 of bar construction 435 will move upward. Carriage 480 will hereby also slide upward via coupling part 450. Pivot point 441 does not change position here.

After collapsing of arm parts 20-2 and 21-2 it becomes possible to operate the operating element 67 with which bar construction 435 can be pulled through its dead centre. By operating handle 67 a protrusion 489 is also a retracted by means of a cable (not shown) equivalent to cable 71 of FIG. 9, whereby pivot point 485 can slide in slot 486 and whereby it thus becomes possible to collapse the pushchair. Protrusion 489 is placed under spring tension here and provided with an inclining side. This makes it possible for the undercarriage and upper carriage to lock relative to each other when the pushchair is folded open.

Coupling part 415 is also pivotally connected to a back rod 406 which forms part of the back part. In FIG. 15 back rod 406 is connected indirectly by means of preferably non-elastic bands 328, 329 to arm part 20-2, 21-2. It is hereby possible for coupling part 415 to move rearward relative to front wheels 44 during collapsing of the pushchair, while the back part will move more and more toward front wheels 44.

As shown in FIG. 16, the back part comprises a plurality of panels 412, 413, 408 which are mutually connected by rods 411 pivotally connected to both the panels and the back rods 406. The lower of these rods 411 are connected by means of a cable (not shown) running through coupling part 414, 415 to respective seat rods 404, 405. The cable engages here from an upper side onto the inner parts of lower rods 411. When the pushchair collapses this cable will cause the lower rods to pivot, whereby they come to lie in the same position as the other rods 411. The back part can as a result fold inward in the transverse direction. In the situation shown in FIG. 16 this folding of the back part is not possible.

The lower rods 411 are under spring tension, this causing rods 411 to move to the situation shown in FIG. 16.

In the fully collapsed position the pivot point 441 lies against the end of slot 481 in carriage 480, whereby pivot point 441 lies substantially against coupling part 450.

Coupling part 414 is preferably embodied in plastic so that it is easier to accommodate the cable to rods 411.

An advantage of the above stated pushchair (s) is that a carrycot or a car seat can be placed thereon and that the undercarriage and upper carriage can be moved to a very compact position. The carrycot and car seat can be coupled in the same manner to the upper carriage as the above-mentioned child's seat, optionally making use of an adapter. A carrycot and car seat are however generally coupled only to arm parts 20-1 and 21-1.

The pushchair according to the invention forms a combination of the features of a compact collapsible buggy and the features of a larger pushchair, such as a qualitatively high-grade seat and the option of mounting a carrycot or car seat. In order to also use the pushchair as buggy it is sufficient to provide only a small set of wheels.

The above-mentioned child's seat can also be applied in pushchairs not having the construction according to the present invention. The child's seat is however particularly suitable for mounting on a pushchair or other child-supporting device wherein use is made of a pivotable rod or tube such as the third and fourth arms of the present invention. This is because the above stated child's seat allows the possibility of such a rod or tube pivoting without the child's seat having to be uncoupled. An exceptionally compact collapsed position is also obtained.

The above described child's seat has first and second coupling elements for coupling the child's seat to different parts of a pivotable rod or tube of the child-supporting device. A first arm and a pivotable arm extend, at a distance from each other, from the first coupling elements to a hinge element. The first arms, generally one for a left-hand side and one for a right-hand side, here define a seat surface, while the pivotable arms provide for strengthening. These latter arms generally comprise two parts connected pivotally to each other.

Extending from the hinge elements are second arms which define a back surface. These arms are preferably non-pivotable relative to the hinge elements. The back surface is further connected to the second coupling elements by means of flexible parts, preferably in the form of bands with little or no elasticity. In the position of use the back surface is fixed by these flexible parts such as a child cannot sink backwards, or hardly so, through displacement of the back surface.

For application in collapsible child-supporting devices such as the pushchair according to the present invention such a child's seat can be collapsible in a transverse direction. The second arms can be mutually coupled here by a pivotable transverse connection. The seat surface can be formed by a piece of fabric between the first arms, whereby it can easily become narrower.

The back surface can be provided with a panel for supporting a back of a child. The panel can be pivotally connected on two sides to the second arms by means of connecting arms. The connection between the second arms and the connecting arms is otherwise also pivotable. Further panels can be arranged on the connecting arms.

It will be apparent to the skilled person that various modifications are possible to the embodiments shown here without departing from the scope of protection of the present invention. This scope of protection is described solely by the appended claims.

The invention claimed is:

1. Device for supporting a child, comprising:
   an undercarriage with a pivotable transverse connection, wherein the undercarriage is collapsible in a first direction by means of pivoting the pivotable transverse connection;
   an upper carriage pivotally coupled to the undercarriage, wherein the undercarriage and upper carriage can rotate toward each other;
   a transmission for converting a relative rotation movement of the undercarriage and the upper carriage toward each other to a collapsing movement of the pivotable transverse connection, wherein the transmission comprises a first engaging element connected to an end of the upper carriage and a second engaging element connected to an end of the transverse connection, wherein the first and second engaging elements are mutually engaged with each other;
   wherein the device is movable between:
   a collapsed position wherein the undercarriage is folded down; and
   a position of use wherein the upper carriage extends at an angle relative to the undercarriage;
   wherein the undercarriage and the upper carriage can rotate toward each other about a rotation axis substantially parallel to the first direction; and
   wherein the transverse connection is disposed at a position of the rotation axis.

2. Device as claimed in claim 1, wherein the transverse connection comprises a first elongate part and a second elongate part which are coupled to each other for mutual pivoting at an end and which are each separately coupled pivotally to a first remaining part of the undercarriage at another end, and wherein in the position of use the first elongate part lies in line with and/or is locked to the second elongate part.

3. Device as claimed in claim 2, wherein the undercarriage comprises:
   a first arm provided with a first coupling housing;
   a second arm provided with a second coupling housing; wherein the first elongate part is pivotally connected to the first coupling housing and the second elongate part is pivotally connected to the second coupling housing; and
   wherein the upper carriage is pivotally connected to the first coupling housing and the second coupling housing.

4. Device as claimed in claim 3, wherein the upper carriage comprises:
   a third arm pivotally coupled to the first coupling housing; and
   a fourth arm pivotally coupled to the second coupling housing.

5. Device as claimed in claim 4, further comprising at least one connecting arm between the undercarriage and the upper carriage, wherein the at least one connecting arm is coupled slidably and pivotally to one of the undercarriage or the upper carriage and is connected pivotally to the other one of the undercarriage or the upper carriage.

6. Device as claimed in claim 5, wherein the at least one connecting arm is placed between the first arm and the third arm and/or between the second arm and the fourth arm.

7. Device as claimed in claim 6, further comprising a locking mechanism for locking a sliding movement of the at least one connecting arm between the first arm and the third arm and/or for locking the sliding movement of the at least one connecting arm between the second arm and the fourth arm.

8. Device as claimed in claim 7, wherein the at least one connecting arm is coupled slidably and pivotally to the undercarriage and connected pivotally to the upper carriage, wherein the transmission comprises at least one coupling arm between the transverse connection and the at least one connecting arm, wherein the at least one connecting arm and the at least one coupling arm are embodied such that, during the relative rotation movement of the undercarriage and the upper carriage toward each other, the at least one connecting arm slides away from the transverse connection and thereby causes pivoting of the transverse connection.

9. Device as claimed in claim 8, wherein a first coupling arm is disposed between the at least one connecting arm for the first arm and the first elongate part and a second coupling arm is disposed between the at least one connecting arm for the second arm and the second elongate part.

10. Device as claimed in claim 7, wherein the locking mechanism for locking the sliding movement of the connecting arm between the first arm and the third arm and/or for locking the sliding movement of the connecting arm between the second arm and the fourth arm comprises an operating element for operation of the locking mechanism which is received in a first or a second upper carriage part and which can only be accessed and/or operated by a user after unlocking and relative rotation of the first and second upper carriage parts.

11. Device as claimed in claim 6, wherein the at least one connecting arm includes a pair of connecting arms which are placed spaced apart in transverse direction and which are mutually connected by means of a bar construction which can be collapsed in the first direction, wherein the bar construction is biased so as to form a stiff connection between the connecting arms in the position of use.

12. Device as claimed in claim 11, wherein the bar construction has a dead centre beyond which the bar construction must move so as to no longer form a stiff connection, the device further comprising an unlocking mechanism which can be operated by a user to unlock the bar construction by moving the bar construction beyond the dead centre.

13. Device as claimed in claim 12, wherein the unlocking mechanism and a locking mechanism for locking a sliding movement of the connecting arm between the first arm and the third arm or the connecting arm between the second arm and the fourth arm can be operated simultaneously by a single operation by the user.

14. Device as claimed in claim 4, wherein the upper carriage is fixedly connected at an end to a first toothed wheel part which is disposed for rotation about the rotation axis, and wherein the transverse connection is fixedly connected at an end to a second toothed wheel part which engages perpendicularly on the first toothed wheel part, wherein the third arm is fixedly connected at an end thereof to the first toothed wheel part which rotates about the rotation axis during a relative rotation movement of the undercarriage and the upper carriage toward each other, and wherein the first elongate part is connected at an end directed toward the first arm to the second toothed wheel part, wherein the second toothed wheel part can rotate about a first axis connected fixedly to the first arm for the purpose of said pivoting of the first elongate part relative to the first arm.

15. Device as claimed in claim 14, wherein the first axis is placed in the first coupling housing and wherein the third arm is provided at an end thereof with a second axis which extends parallel to the rotation axis and in a cavity of the first coupling housing, and which second axis is connected at an end thereof to the first toothed wheel part.

16. Device as claimed in claim 14, wherein the fourth arm is fixedly connected at an end thereof to another toothed wheel part which rotates about the rotation axis during a relative rotation movement of the undercarriage and the upper carriage toward each other, and wherein the second elongate part is connected at an end directed toward the second arm to a further toothed wheel part, wherein the further toothed wheel part can rotate about a third axis connected fixedly to the second arm for the purpose of said pivoting of the second elongate part relative to the second arm.

17. High chair, comprising the device for supporting a child as defined in claim 4.

18. High chair as claimed in claim 17, wherein the first arm and the second arm form girders for supporting the high chair on a ground surface, and wherein the third and fourth arm are uprights which are connectable or are connected to a seat part.

19. Device as claimed in claim 4, comprising a separate transmission for:
  converting a relative rotation movement of the first arm and the third arm toward each other to a collapsing movement of the first elongate part of the transverse connection; and/or
  converting a relative rotation movement of the second arm and the fourth arm toward each other to a collapsing movement of the second elongate part of the transverse connection.

20. Child's bed, comprising a device for supporting a child as defined in claim 4.

21. Device as claimed in claim 3, wherein the first and second coupling housings are each connected to support structures support blocks or wheels, for supporting the device on a ground surface.

22. Device as claimed in claim 3, wherein the first arm, the second arm and the transverse connection lie substantially in the same plane wherein, during collapsing of the transverse connection, the first elongate part and the second elongate part pivot in said same plane.

23. Device as claimed in claim 3, wherein:
  the first arm, the second arm and the transverse connection form a U-shaped profile; or
  the first arm, the second arm and the transverse connection form a triangular profile wherein the first arm and the second arm are pivotally coupled to each other on a side directed away from the transverse connection.

24. Device as claimed in claim 2, wherein the undercarriage comprises a further pivotable transverse connection, the further transverse connection of the undercarriage comprising a first elongate part and a second elongate part which are coupled to each other for mutual pivoting at an end and which are each separately coupled pivotally to a second remaining part of the undercarriage at another end, and wherein in the position of use the first elongate part of the further transverse connection lies in line with and/or is locked to the second elongate part of the further transverse connection, and wherein the transverse connection and the further transverse connection of the undercarriage are coupled such that the transverse connection and the further transverse connection of the undercarriage pivot substantially simultaneously.

25. Device as claimed in claim 24, comprising a locking mechanism which can be operated by a user to lock the transverse connection and/or a further locking mechanism which can be operated by a user to lock the further transverse connection of the undercarriage.

26. Device as claimed in claim 2, wherein the transverse connection comprises a hinge element for the purpose of said mutual pivoting of the first elongate part and the second elongate part, wherein the transmission is adapted to convert the relative rotation movement of upper carriage and undercarriage toward each other to a movement of the hinge element for the purpose of collapsing the undercarriage.

27. Device as claimed in claim 2, wherein the upper carriage is collapsible in the first direction by means of a further pivotable transverse connection, the further transverse connection of the upper carriage comprising a first elongate part and a second elongate part which are coupled to each other for mutual pivoting at an end and which are each separately coupled pivotally to a remaining part of the upper carriage at another end, and wherein in the position of use the first elongate part of the upper carriage lies in line with and/or is locked to the second elongate part of the upper carriage, and wherein the upper carriage is embodied such that, during the relative rotation movement of the upper carriage and the undercarriage toward each other, the further transverse connection collapses, the device further comprising a further locking mechanism which can be operated by a user to lock the further transverse connection of the upper carriage.

28. Device as claimed in claim 1, wherein the upper carriage comprises a first upper carriage part and a second upper carriage part which are pivotally coupled to each other for mutual pivoting about an axis parallel to the rotation axis.

29. Device as claimed in claim 28, further comprising a connecting arm coupled slidably and pivotally to the first upper carriage part and connected pivotally to the undercarriage, the device further comprising a child's seat collapsible in the first direction and provided with a back part and a seat part mutually connected by a hinge for a rotation about an axis parallel to the first direction, wherein the seat part comprises on a hip side thereof a seat arm which is connected pivotally from the hinge to the connecting arm as well as a seat part coupling arm which is connected pivotally from the hinge to the first upper carriage part, and wherein the back part comprises on a side thereof a back arm which extends from the hinge and which is pivotally connected directly or via a transmission to the second upper carriage part.

30. Device as claimed in claim 29, wherein the child's seat is provided with a first insert part which is received in a recess in the first upper carriage part, wherein the seat part coupling arm is pivotally connected to the first insert part, the child's seat further comprising a second insert part which is received in a recess in the second upper carriage part and to which the back arm is pivotally connected.

31. Device as claimed in claim 30, wherein the connection between the first and second insert parts and respectively the first upper carriage part and the second upper carriage part is releasable, whereby the child's seat can be detached from the rest of the device.

32. Device as claimed in claim 28, comprising a locking mechanism which can be operated by a user for mutual locking of the first and the second upper carriage parts.

33. Pushchair, comprising the device for supporting a child as defined in claim 1.

34. Pushchair as claimed in claim 33, wherein the undercarriage of the device is provided with wheels and forms an undercarriage of the pushchair and wherein the upper carriage of the device forms a push bar of the pushchair.

35. Pushchair as claimed in claim 24, wherein the transverse connection comprises a first elongate part and a second elongate part which are coupled to each other for mutual pivoting at an end and which are each separately coupled pivotally to a remaining part of the undercarriage at another end, and wherein in the position of use the first elongate part lies in line with and/or is locked to the second elongate part; wherein the undercarriage comprises:
- a first arm provided with a first coupling housing;
- a second arm provided with a second coupling housing; wherein the first elongate part is pivotally connected to the first coupling housing and the second elongate part is pivotally connected to the second coupling housing; and wherein the upper carriage is pivotally connected to the first coupling housing and the second coupling housing; wherein the upper carriage comprises:
- a third arm pivotally coupled to the first coupling housing; and
- a fourth arm pivotally coupled to the second coupling housing; wherein the third arm and the fourth arm are push bars for pushing along the pushchair, and wherein the first and second arms are provided with wheels.

36. Pushchair as claimed in claim 35, wherein the wheels are connected for swiveling to the first or the second coupling housing.

37. Pushchair as claimed in claim 33, wherein the upper carriage is connectable or is connected to a child's seat which is collapsible in the first direction.

38. Device as claimed in claim 1, wherein the first engaging element and the second engaging element each comprise a toothed wheel part.

39. Device as claimed in claim 38, wherein the upper carriage is fixedly connected at an end to a first toothed wheel part which is disposed for rotation about the rotation axis, and wherein the transverse connection is fixedly connected at an end to a second toothed wheel part which engages perpendicularly on the first toothed wheel part.

40. Device as claimed in claim 39, wherein the second toothed wheel part can rotate about a first axis connected fixedly to the undercarriage.

41. Device as claimed in claim 1, wherein the first engaging element and the second engaging element directly engage one another.

42. Device for supporting a child, comprising:

an undercarriage with a pivotable transverse connection, wherein the undercarriage is collapsible in a first direction by means of pivoting the pivotable transverse connection;

an upper carriage pivotally coupled to the undercarriage, wherein the undercarriage and upper carriage can rotate toward each other;

a transmission for converting a relative rotation movement of the undercarriage and the upper carriage toward each other to a collapsing movement of the pivotable transverse connection, wherein the transmission comprises a first engaging element connected to an end of the upper carriage and a second engaging element connected to an end of the transverse connection, wherein the first and second engaging elements are mutually engaged with each other;

wherein the device is movable between:
- a collapsed position wherein the undercarriage is folded down; and
- a position of use wherein the upper carriage extends at an angle relative to the undercarriage;

wherein the transverse connection comprises a first elongate part and a second elongate part which are coupled to each other for mutual pivoting at an end and which are each separately coupled pivotally to a remaining part of the undercarriage at another end, and wherein in the position of use the first elongate part lies in line with and/or is locked to the second elongate part;

wherein the undercarriage comprises:

a first arm provided with a first coupling housing;

a second arm provided with a second coupling housing; wherein the first elongate part is pivotally connected to the first coupling housing and the second elongate part is pivotally connected to the second coupling housing; and wherein the upper carriage is pivotally connected to the first coupling housing and the second coupling housing.

\* \* \* \* \*